United States Patent
Sakamaki et al.

(10) Patent No.: US 9,367,764 B2
(45) Date of Patent: Jun. 14, 2016

(54) IMAGE PROCESSING SYSTEM, IMAGE PROCESSING DEVICE, IMAGE PROCESSING METHOD, PROGRAM, AND INFORMATION STORAGE MEDIUM FOR PROVIDING AN AID THAT MAKES IT EASY TO GRASP COLOR OF AN IMAGE

(75) Inventors: Ryuji Sakamaki, Tokyo (JP); Hiroyuki Koike, Tokyo (JP); Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/375,431

(22) PCT Filed: Apr. 10, 2012

(86) PCT No.: PCT/JP2012/059752
§ 371 (c)(1),
(2), (4) Date: Jul. 29, 2014

(87) PCT Pub. No.: WO2013/114638
PCT Pub. Date: Aug. 8, 2013

(65) Prior Publication Data
US 2014/0355874 A1    Dec. 4, 2014

(30) Foreign Application Priority Data

Jan. 30, 2012  (JP) ................................. 2012-016612

(51) Int. Cl.
*G06K 9/00* (2006.01)
*G06K 9/62* (2006.01)
*H04N 1/40* (2006.01)
*G06T 11/00* (2006.01)
(Continued)

(52) U.S. Cl.
CPC ............ *G06K 9/6215* (2013.01); *G06K 9/4652* (2013.01); *G06T 11/00* (2013.01); *H04N 1/40012* (2013.01); *H04N 1/622* (2013.01)

(58) Field of Classification Search
None
See application file for complete search history.

(56) References Cited

U.S. PATENT DOCUMENTS 5,586,197 A * 12/1996 Tsujimura ........... G06F 17/3025
                                                    382/162
6,181,818 B1 * 1/2001 Sato .................. G06F 17/30256
                                                    382/170
(Continued)

FOREIGN PATENT DOCUMENTS

JP     H01-276334 A     11/1989
JP     H02-187864 A      7/1990
(Continued)

OTHER PUBLICATIONS

Koji Yoshimoto et al. Color Distinguishing Application "ColorAttendant", Fujitsu, Fujitsu Limited, Nov. 10, 2008, vol. 59, No. 6, p. 677-681.

(Continued)

*Primary Examiner* — Feng Niu
(74) *Attorney, Agent, or Firm* — Hubbs, Enatsky & Inoue PLLC

(57) ABSTRACT

A color information obtaining unit obtains color information of an attention point or an attention area within a target image. A similarity information obtaining unit obtains similarity information related to a level of similarity between color information of an image that is stored in a storage in advance and the color information obtained by the color information obtaining unit. A notification unit causes an output unit to output a notification based on the similarity information.

12 Claims, 18 Drawing Sheets

(51) Int. Cl.
*G06K 9/46* (2006.01)
*H04N 1/62* (2006.01)

(56) References Cited

U.S. PATENT DOCUMENTS

| | | | | |
|---|---|---|---|---|
| 6,246,804 | B1* | 6/2001 | Sato | G06F 17/30256 382/284 |
| 6,411,953 | B1* | 6/2002 | Ganapathy | G06F 17/3025 |
| 7,006,689 | B2* | 2/2006 | Kasutani | G06F 17/3025 375/240.2 |
| 7,515,744 | B2* | 4/2009 | Okutsu | G06K 9/4652 382/162 |
| 8,131,083 | B2* | 3/2012 | Yoshino | G06F 17/30247 345/156 |
| 8,498,473 | B2* | 7/2013 | Chong | G06F 17/3025 382/162 |
| 8,671,025 | B2* | 3/2014 | Mehra | G06Q 30/06 705/26.1 |
| 8,744,180 | B2* | 6/2014 | Atsmon | G06Q 10/00 382/162 |
| 2005/0007449 | A1 | 1/2005 | Ikado | |
| 2005/0210019 | A1* | 9/2005 | Uehara | G06F 17/30256 |
| 2007/0088748 | A1* | 4/2007 | Matsuzaki | G06F 17/30265 |
| 2008/0068456 | A1* | 3/2008 | Fujii | G06F 17/3025 348/130 |
| 2008/0215548 | A1 | 9/2008 | Ohashi et al. | |
| 2008/0247677 | A1* | 10/2008 | Yoshino | G06F 17/30247 382/305 |
| 2012/0051634 | A1* | 3/2012 | Chong | G06F 17/3025 382/165 |
| 2013/0022264 | A1* | 1/2013 | Atsmon | G06Q 10/00 382/165 |
| 2014/0122283 | A1* | 5/2014 | Mehra | G06F 17/30277 705/26.1 |

FOREIGN PATENT DOCUMENTS

| | | |
|---|---|---|
| JP | H10-276732 A | 10/1998 |
| JP | 2008-192055 A | 8/2008 |
| JP | 2009-284214 A | 12/2009 |
| JP | 2010-122519 A | 6/2010 |
| JP | 2011-066523 A | 3/2011 |
| WO | 2004/023397 A1 | 3/2004 |

OTHER PUBLICATIONS

Partial translation of the office action for Japanese patent application No. 2012-016612 dated on Jan. 20, 2015.

English translation of International Search Report for PCT/JP2012/059752 dated May 22, 2012.

* cited by examiner

FIG.4

| ID | COLOR NAME | COLOR CODE | REPRESENTATIVE COLOR | | |
|---|---|---|---|---|---|
| | | | R | G | B |
| 01 | BLACK | #000000 | 0 | 0 | 0 |
| 02 | WHITE | #FFFFFF | 255 | 255 | 255 |
| 03 | GRAY | #808080 | 128 | 128 | 128 |
| 04 | BROWN | #800000 | 128 | 0 | 0 |
| 05 | RED | #FF0000 | 255 | 0 | 0 |
| 06 | OCHER | #808000 | 128 | 128 | 0 |
| 07 | YELLOW | #FFFF00 | 255 | 255 | 0 |
| 08 | GREEN | #008000 | 0 | 128 | 0 |
| 09 | LIME | #00FF00 | 0 | 255 | 0 |
| 10 | BLUE-GREEN | #008080 | 0 | 128 | 128 |
| 11 | AQUA | #00FFFF | 0 | 255 | 255 |
| 12 | NAVY | #000080 | 0 | 0 | 128 |
| 13 | BLUE | #0000FF | 0 | 0 | 255 |
| 14 | PURPLE | #800080 | 128 | 0 | 128 |
| 15 | PINK | #FF00FF | 255 | 0 | 255 |

| ID | IMAGE | DESCRIPTION | COLOR FEATURE AMOUNT |
|---|---|---|---|
| P001 | --- | --- | --- |
| P002 | --- | --- | --- |
| P003 | --- | --- | --- |
| ... | ... | ... | ... |

| ID | IMAGE | TYPE | REGISTERING USER | DESCRIPTION | COLOR FEATURE AMOUNT |
|---|---|---|---|---|---|
| P001 | --- | 0 | | --- | --- |
| P002 | --- | 0 | | --- | --- |
| P003 | --- | 0 | | --- | --- |
| ... | ... | ... | ... | ... | ... |
| P100 | --- | 1 | U001 | --- | --- |
| P100 | --- | 1 | U001 | --- | --- |
| ... | ... | ... | ... | ... | ... |

| ID | IMAGE | TYPE | REGISTERING USER | DESCRIPTION | COLOR | COLOR FEATURE AMOUNT |
|---|---|---|---|---|---|---|
| P001 | --- | 0 |  | --- | 05 | --- |
| P002 | --- | 0 |  | --- | 12 | --- |
| P003 | --- | 0 |  | --- | 08 | --- |
| ... | ... | ... | ... | ... | ... | ... |
| P100 | --- | 1 | U001 | --- | 02 | --- |
| P101 | --- | 1 | U001 | --- | 12 | --- |
| ... | ... | ... | ... | ... | ... | ... |

| EXEMPLARY COMBINATION |
|---|
| 01, 03 |
| 05, 12 |
| ... |

| ID | IMAGE | TYPE | REGISTERING USER | DESCRIPTION | COLOR | COLOR FEATURE AMOUNT | SELECTION STATUS |
|---|---|---|---|---|---|---|---|
| P001 | --- | 0 | | --- | 05 | --- | 0 |
| P002 | --- | 0 | | --- | 12 | --- | 0 |
| P003 | --- | 0 | | --- | 08 | --- | 0 |
| ... | ... | ... | ... | ... | ... | ... | ... |
| P100 | --- | 1 | U001 | --- | 02 | --- | 0 |
| P101 | --- | 1 | U001 | --- | 12 | --- | 1 |
| ... | ... | ... | ... | ... | ... | ... | ... |

IMAGE PROCESSING SYSTEM, IMAGE PROCESSING DEVICE, IMAGE PROCESSING METHOD, PROGRAM, AND INFORMATION STORAGE MEDIUM FOR PROVIDING AN AID THAT MAKES IT EASY TO GRASP COLOR OF AN IMAGE

CROSS REFERENCE TO RELATED APPLICATIONS

This application is a National Stage of International Application No. PCT/JP2012/059752 filed Apr. 10, 2012, claiming priority based on Japanese Patent Application No. 2012-016612 filed on Jan. 30, 2012. The contents of each of the above documents are incorporated herein by reference in their entirety.

TECHNICAL FIELD

The present invention relates to an image processing system, an image processing device, an image processing method, a program, and an information storage medium.

BACKGROUND ART

Various technologies for aiding a color-blind person who has impaired color vision in grasping the color of an image have been proposed. Patent Literature 1, for example, discloses a technology in which the color of an image transmitted from a user's portable terminal is analyzed and color data is transmitted to the portable terminal. Patent Literatures 2, 3, and 4 disclose technologies with which the color of a graph or text is presented in a form that can be identified by a color-blind person (e.g., color name).

CITATION LIST

Patent Literature

[Patent Literature 1] WO 2004/023397 A1
[Patent Literature 2] JP 2009-284214 A
[Patent Literature 3] JP 2010-122519 A
[Patent Literature 4] JP 2011-066523 A

SUMMARY OF INVENTION

Technical Problem

A color has many variants different in hue. For instance, the color "red" includes dark red and light red. The color-blind person may therefore find it difficult to grasp the color when only a color name is presented to the color-blind person, for example. A possible alternative is to present a color value (e.g., RGB value) to the color-blind person, but this method has a problem in that the color-blind person finds it difficult to grasp the color instinctively.

The present invention has been made in view of the problems described above, and an object of the present invention is to provide an image processing system, an image processing device, an image processing method, a program, and an information storage medium that are capable of providing an aid that makes it easy for a color-blind person to grasp the color of an image.

Solution to Problem

In order to solve the above-mentioned problem, an image processing system according to one embodiment of the present invention is an image processing system, including: target image obtaining means for obtaining a target image; color information obtaining means for obtaining color information of an attention point or an attention area within the target image; similarity information obtaining means for obtaining similarity information related to a level of similarity between color information of an image that is stored in image storing means in advance and the color information obtained by the color information obtaining means; and notification means for making a notification based on the similarity information to a user.

Further, an image processing device according to one embodiment of the present invention is an image processing device, including: color information obtaining means for obtaining color information of an attention point or an attention area within a target image; similarity information obtaining means for obtaining similarity information related to a level of similarity between color information of an image that is stored in image storing means in advance and the color information obtained by the color information obtaining means; and notification means for making a notification based on the similarity information to a user.

Further, an image processing method according to one embodiment of the present invention is an image processing method, including: a color information obtaining step of obtaining color information of an attention point or an attention area within a target image; a similarity information obtaining step of obtaining similarity information related to a level of similarity between color information of an image that is stored in image storing means in advance and the color information obtained in the color information obtaining step; and a notification step of making a notification based on the similarity information to a user.

Further, a program according to one embodiment of the present invention is a program for causing a computer to function as: color information obtaining means for obtaining color information of an attention point or an attention area within a target image; similarity information obtaining means for obtaining similarity information related to a level of similarity between color information of an image that is stored in image storing means in advance and the color information obtained by the color information obtaining means; and notification means for making a notification based on the similarity information to a user.

Further, a computer-readable information recording medium according to one embodiment of the present invention is a computer-readable information recording medium having recorded thereon a program for causing a computer to function as: color information obtaining means for obtaining color information of an attention point or an attention area within a target image; similarity information obtaining means for obtaining similarity information related to a level of similarity between color information of an image that is stored in image storing means in advance and the color information obtained by the color information obtaining means; and notification means for making a notification based on the similarity information to a user.

Further, in an aspect of the present invention, the image processing system may further include search means for searching for an image having color information that is the same as or similar to the color information obtained by the color information obtaining means from among a plurality of images stored in the image storing means, and the notification means may present to the user the similarity information related to the level of similarity between the color information of the image found by the search means and the color information obtained by the color information obtaining means.

Further, in an aspect of the present invention, the notification means may present to the user the similarity information, and at least one of the image found by the search means itself or information related to the image found by the search means.

Further, in an aspect of the present invention, the image storing means may store images taken or selected by the user in the past.

Further, in an aspect of the present invention, the image processing system may further include: exemplary combination data storing means for storing exemplary combination data related to exemplary combinations of color information; determining means for determining, based on the exemplary combination data, whether or not a combination of the color information of the image stored in the image storing means and the color information obtained by the color information obtaining means is one of the exemplary combinations; and second notification means for making a notification to the user in a case where it is determined that the combination of the color information of the image stored in the image storing means and the color information obtained by the color information obtaining means is one of the exemplary combinations.

Further, in an aspect of the present invention, in the case where it is determined that the combination of the color information of the image stored in the image storing means and the color information obtained by the color information obtaining means is one of the exemplary combinations, the second notification means may present at least one of the image or information related to the image to the user.

Further, in an aspect of the present invention, the image processing system may further include means for setting, as a base image, based on a user's selection operation, one of a plurality of images stored in the image storing means, and the determining means may determine whether or not a combination of the color information of the base image and the color information obtained by the color information obtaining means is one of the exemplary combinations, and the second notification means may make the notification to the user in a case where it is determined that the combination of the color information of the base image and the color information obtained by the color information obtaining means is one of the exemplary combinations.

Further, in an aspect of the present invention, the image processing system may further include means for setting, as a base image, based on a user's selection operation, one of a plurality of images stored in the image storing means, and the similarity information obtaining means may obtain the similarity information related to the level of similarity between the color information of the base image and the color information obtained by the color information obtaining means, and the notification means may include at least one of: means for making the notification to the user in a case where the similarity level is higher than a reference similarity level; or means for notifying the user of the similarity information.

Further, in an aspect of the present invention, the image processing system may further include: means for obtaining, repeatedly as time elapses, a photographed image of a subject whose color changes with the elapse of time as the target image; and means for setting, as the attention point or the attention area, a point or an area within an area of the target image where the photographed subject is located.

Further, in an aspect of the present invention, the image processing system may further include means for presenting to the user an area within the target image that is a continuous area including the attention point or the attention area and that has color information that is the same as or similar to the color information of the attention point or the attention area.

Further, in an aspect of the present invention, the image processing system may further include: means for determining to which of a plurality of pieces of color group information the color information obtained by the color information obtaining means belongs; and means for presenting to the user one of the plurality of pieces of color group information to which the color information obtained by the color information obtaining means belongs.

Further, in an aspect of the present invention, the image processing system may further include means for setting the attention point or the attention area based on a point or an area within the target image that is specified by the user.

Advantageous Effects of Invention

According to one embodiment of the present invention, it is possible to provide an aid that makes it easy for a color-blind person to grasp the color of an image.

BRIEF DESCRIPTION OF DRAWINGS

FIG. 4 is a diagram showing an example of a color group table.

DESCRIPTION OF EMBODIMENTS

Now, an exemplary embodiment of the present invention is described in detail with reference to the accompanying drawings.

First Embodiment

Figure 1:
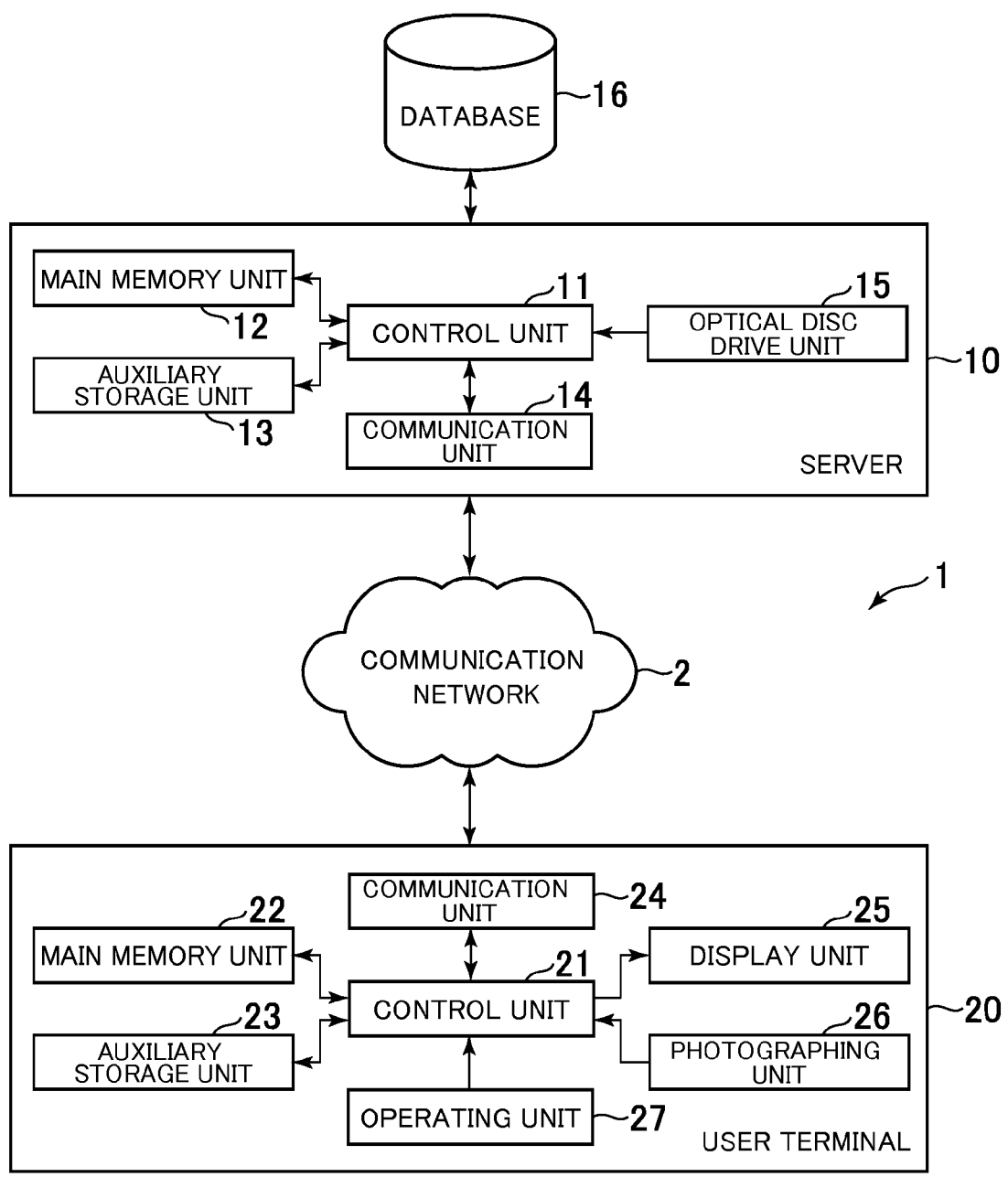
FIG. 1 is a diagram illustrating an example of the overall configuration of an image processing system according to embodiments of the present invention.

A first embodiment of the present invention is described first. FIG. 1 illustrates an example of the overall configuration of an image processing system 1 according to the first embodiment of the present invention. As illustrated in FIG. 1, the image processing system 1 according to this embodiment includes a server 10 (image processing device), a database 16, and a user terminal 20. The server 10 and the user terminal 20 are connected to a communication network 2 including the Internet, for example, so that mutual data communication can be performed between the server 10 and the user terminal 20.

The server 10 includes a control unit 11, a main memory unit 12, an auxiliary storage unit 13, a communication unit 14, and an optical disc drive unit 15. The control unit 11 includes, for example, one or a plurality of CPUs, and executes information processing in accordance with an operating system or a program stored in the auxiliary storage unit 13. The main memory unit 12 is, for example, a RAM. The auxiliary storage unit 13 is, for example, a hard disk or a solid state drive. The communication unit 14 is used for performing data communication via the communication network 2. The optical disc drive unit 15 is used for reading a program or data recorded on an optical disc (information storage medium).

The program or data is supplied to the auxiliary storage unit 13 via an optical disc (information storage medium). Specifically, the program or data stored on the optical disc is read by the optical disc drive unit 15 and stored in the auxiliary storage unit 13. Note that, the server 10 may include a component necessary for reading a program or data stored in an information storage medium other than the optical disc (for example, a memory card). Then, the program or data may be supplied to the auxiliary storage unit 13 via the information storage medium other than the optical disc (for example, a memory card). Alternatively, a program or data may be supplied to the auxiliary storage unit 13 via the communication network 2.

The server 10 is accessible to the database 16. The database 16 may be built in the server 10, or may be built in another server than the server 10. A plurality of images are stored in the database 16 as described later.

The user terminal 20 is an information processing device that is used by a user. The user terminal 20 is, for example, a cell phone (including a smartphone), a portable information terminal, or a personal computer. The user terminal 20 in the following description is a cell phone (a smartphone).

The user terminal 20 includes a control unit 21, a main memory unit 22, an auxiliary storage unit 23, a communication unit 24, a display unit 25, a photographing unit 26, and an operating unit 27. The control unit 21, the main memory unit 22, the auxiliary storage unit 23, and the communication unit 24 are the same as the control unit 11, the main memory unit 12, the auxiliary storage unit 13, and the communication unit 14 of the server 10.

A program or data is supplied to the auxiliary storage unit 23 via the communication network 2. Note that, the user terminal 20 may include an optical disc drive unit. Then, a program or data may be supplied to the auxiliary storage unit 23 via an optical disc (information storage medium). Alternatively, the user terminal 20 may include a component necessary for reading a program or data stored in an information storage medium other than the optical disc (for example, a memory card). Then, the program or data may be supplied to the auxiliary storage unit 23 via the information storage medium other than the optical disc (for example, a memory card).

The display unit 25 is, for example, a liquid crystal display or an organic EL display, and displays various kinds of screens. The photographing unit 26 is, for example, a digital camera. The photographing unit 26 is capable of taking a still image. The photographing unit 26 is also capable of photographing a video. For instance, the photographing unit 26 takes a picture at given time intervals (e.g., 1/60-second intervals). In other words, the photographing unit 26 photographs a video that has a given number of frames (e.g., sixty frames) per second. A still image or video taken by the photographing unit 26 is saved in the auxiliary storage unit 13.

The operating unit 27 is used by a user for operation. For example, a pointing device for allowing the user to specify a position in the screen displayed on the display unit 25 is equipped as the operating unit 27. For example, a touch panel overlaid on the display unit 25 is equipped in the user terminal 20. Note that, the user terminal 20 may include, for example, a mouse, a stick, or a touchpad instead of the touch panel.

The information processing system 1 according to this embodiment has a function for aiding a user with color blindness in grasping the color of an image. The function is described below. The following description discusses a case where the user with color blindness wishes to check the color of a piece of clothing at a clothing store.

Figure 2:
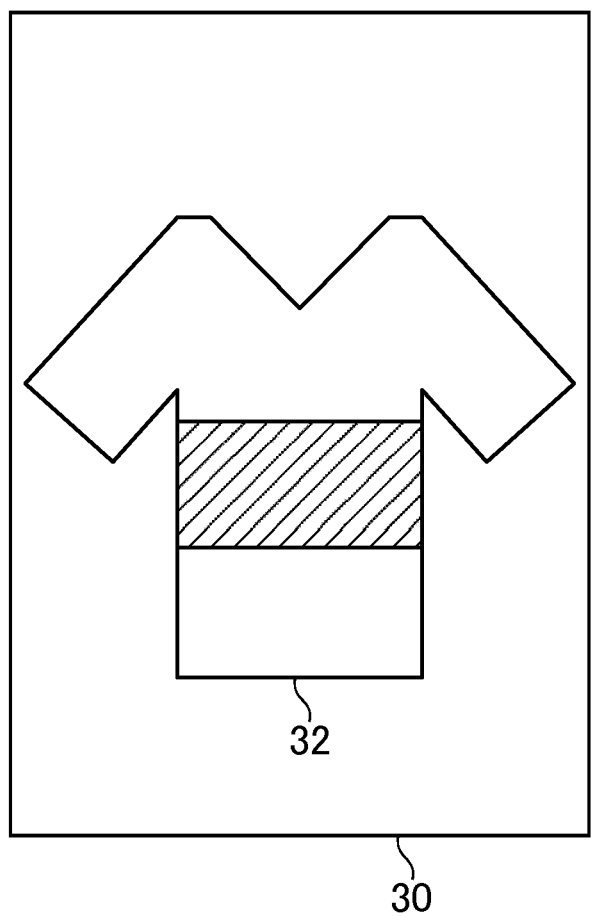
FIG. 2 is a diagram illustrating an example of a color check screen.

Steps taken by a user to grasp the color of a piece of clothing are described. The user who wishes to grasp the color of a piece of clothing uses the photographing unit 26 to photograph the piece of clothing. The photographed image taken by the photographing unit 26 is displayed on a color check screen. FIG. 2 illustrates an example of the color check screen displayed on the display unit 25 of the user terminal 20. A photographed image of a piece of clothing 32 is displayed on the color check screen 30 of FIG. 2. The background which is included in an actual photographed image is omitted here.

Figure 3:
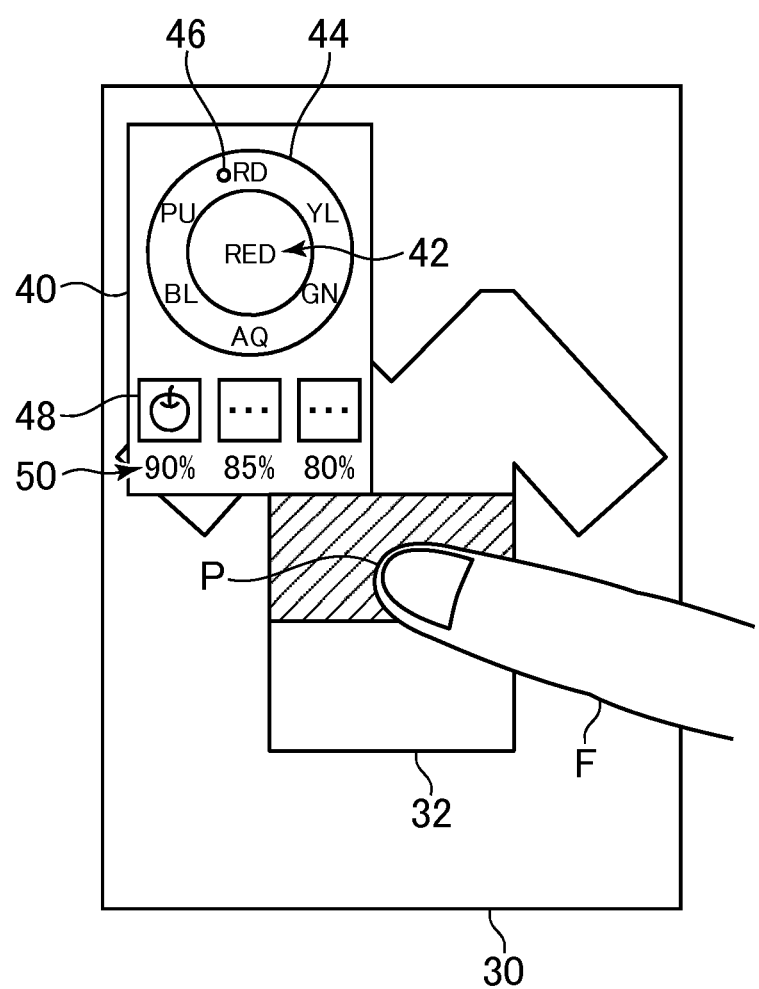
FIG. 3 is a diagram illustrating the example of the color check screen.

The user specifies a point on the color check screen 30 where the color is to be checked. For example, as illustrated in FIG. 3, the user touches the touch panel with a finger F to specify a point where the color is to be checked. When a point where the color is to be checked is specified, a notification field 40 related to the color of the specified point P which has been specified by the user is displayed on the color check screen 30.

A color group name 42, a color map 44, a marker 46, a reference image 48, and a similarity 50 are displayed in the notification field 40.

The color group name 42 indicates the name of a color group to which the color of the user's specified point P belongs. In this embodiment, fifteen different color groups are defined (see FIG. 4 which is described later), and to which of the fifteen different color groups the color of the specified point P belongs is determined. The name of a color group to which the color of the specified point P belongs is displayed as the color group name 42.

The color map 44 shows a map of colors. The color map 44 in the example of FIG. 3 has a donut shape. The color map 44 is not limited to a donut shape and may have other shapes.

Pieces of text "RD", "YL", "GN", "AQ", "BL", and "PU" are arranged at given intervals on the color map 44. A part to which the text "RD" is attached is colored in red, though the coloring is omitted in FIG. 3. A part to which the text "YL" is attached is colored in yellow. The color in a boundary between the part to which the text "RD" is attached and the part to which the text "YL" is attached is changed gradually from red to yellow.

Similarly, a part to which the text "GN" is attached is colored in green. The color in a boundary between the part to which the text "YL" is attached and the part to which the text "GN" is attached is changed gradually from yellow to green. A part to which the text "AQ" is attached is colored in aqua. The color in a boundary between the part to which the text "GN" is attached and the part to which the text "AQ" is attached is changed gradually from green to aqua.

Similarly, a part to which the text "BL" is attached is colored in blue. The color in a boundary between the part to which the text "AQ" is attached and the part to which the text "BL" is attached is changed gradually from aqua to blue. A part to which the text "PU" is attached is colored in purple. The color in a boundary between the part to which the text "BL" is attached and the part to which the text "PU" is attached is changed gradually from blue to purple. The color in a boundary between the part to which the text "PU" is attached and the part to which the text "RD" is attached is changed gradually from purple to red.

The marker 46 is displayed on the color map 44 as well. The marker 46 indicates the color of the user's specified point P. The marker 46 is displayed at a point on the color map 44 that corresponds to the color of the specified point P.

The reference image 48 is an image that leads the user to picture the color of the user's specified point P. In other words, the reference image 48 is a photographed or drawn image of an object whose color is similar to the color of the specified point P. For instance, when the color of the specified point P is "red", images of an apple, a tomato, and a crab are displayed as the reference images 48. In short, a photographed or drawn image of an object that is commonly seen as having a color red is displayed as the reference image 48.

In the case where the color of the specified point P is "blue", an image of a sea, for example, is displayed as the reference image 48. In the case where the color of the specified point P is "green", an image of a frog, for example, is displayed as the reference image 48. In the case where the color of the specified point P is "black", an image of a heap of black sesame seeds, for example, is displayed as the reference image 48.

Three reference images 48 are displayed in the notification field 40 in the example of FIG. 3. Alternatively, more than three reference images 48, or less than three reference images 48 are displayed in the notification field 40.

The similarity 50 indicates the level of similarity between the color of the user's specified point P and the color of the reference image 48. For example, when the color of the specified point P is "red" and an image of an apple is displayed as the reference image 48, the similarity 50 indicates the level of similarity between the color (red) of the specified point P and the color (red) of the reference image 48.

In the notification field 40 described above, the color group name 42, the color map 44, and the marker 46 are displayed.

Therefore, the notification field 40 enables the user to grasp the color of the specified point P. Further, in the notification field 40, the reference image 48 which leads the user to picture the color of the specified point P is displayed. Therefore, the notification field 40 makes it even more easier for the user to grasp the color of the specified point P. Furthermore, in the notification field 40, the similarity 50 which indicates the level of similarity between the color of the specified point P and the color of the reference image 48 is displayed. Therefore, the notification field 40 makes it even more easier for the user to grasp the degree of similarity (in other words, the degree of difference) between the color of the specified point P and the color of the reference image 48. This also enables the user to grasp which of a plurality of reference images 48 is closest in color to the specified point P.

As described above, the image processing system 1 is capable of providing an aid that makes it easier for a user to grasp the color of an image by displaying the notification field 40 on the color check screen 30. Components for implementing the function described above are described below.

Figures 5, 6:
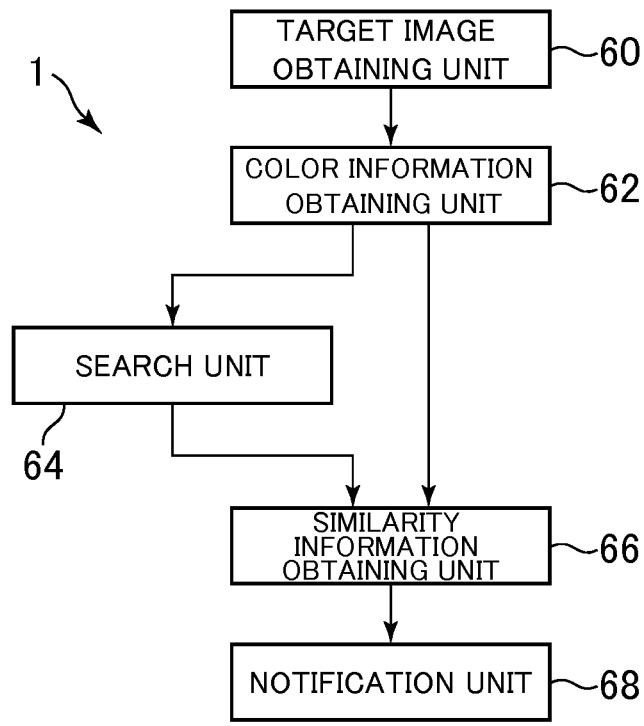
FIG. 5 is a diagram showing an example of an image table.
FIG. 6 is a functional block diagram illustrating an example of functions that are implemented in the image processing system.

Data stored in the database 16 is described first. FIG. 4 and FIG. 5 each show an example of data stored in the database 16.

FIG. 4 shows an example of a color group table. Information related to a plurality of color groups is registered in the color group table. The color group table includes an "ID" field, a "color name" field, a "color code" field, and a "representative color" field. The "ID" field indicates identification information for uniquely identifying a color group (a color group ID). The "color name" field indicates the name of the color group. The "color code" field indicates the color code of a representative color of the color group. The "representative color" field shows the color value (for example, RGB value) of the representative color of the color group. The color value is not limited to the RGB value and a color value in the CIELAB color space or the HSV color space, for example, is used in some cases.

In the example of FIG. 4, fifteen different representative colors (namely, fifteen different color groups) are set by distributing hexadecimal color codes evenly. A color similar to the representative color of a color group belongs to the color group. For instance, a color similar to the representative color of a color group that has a color group ID "01" belongs to the color group having the color group ID "01".

The number of different color groups is not limited to fifteen. There may be fourteen or less different color groups, or sixteen or more different color groups. However, when there are too many different color groups, the user may have difficulties in identifying a color from the name of its color group or the difference between a color (an image) of one color group and a color (an image) of another color group may be insignificantly small. A preferred number of different color groups is therefore around ten to fifteen.

FIG. 5 shows an example of an image table. Information related to a plurality of images stored in the database 16 is registered in the image table. In this embodiment, images that can be displayed in the notification field 40 as the reference images 48 are stored in the database 16. In other words, the database 16 stores, for each color group, one or more typical images that lead a user to picture a color belonging to the color group, and information related to such images is registered in the image table.

The image table includes an "ID" field, an "image" field, a "description" field, and a "color feature amount" field. The "ID field" includes identification information for uniquely identifying an image (an image ID). The "image" field indicates information for identifying an image. For example, link information of an image (a URL and the like) is registered in the "image" field.

The "description" field indicates a descriptive text of the image. In the case of a tomato image, for example, a descriptive text such as "this is an image of a tomato" is registered in the "description" field. The "color feature amount" field indicates the color feature amount of the image. For instance, the color feature amount of n colors of an image reduced to n colors is registered in the "color feature amount" field.

FIG. 6 is a functional block diagram illustrating function blocks that are relevant to the present invention out of function blocks implemented in the image processing system 1. As illustrated in FIG. 6, the image processing system 1 includes a target image obtaining unit 60, a color information obtaining unit 62, a search unit 64, a similarity information obtaining unit 66, and a notification unit 68.

These function blocks are implemented by the server 10 or the user terminal 20. For example, the target image obtaining unit 60 and the color information obtaining unit 62 are implemented by the user terminal 20. Specifically, the control unit 21 of the user terminal 20 executes processing according to a program, thereby functioning as those function blocks. The search unit 64, the similarity information obtaining unit 66, and the notification unit 68 are implemented by the server 10. Specifically, the control unit 11 of the server 10 executes processing according to a program, thereby functioning as those function blocks.

The target image obtaining unit 60 is described. The target image obtaining unit 60 obtains an image of a processing target (target image). In the case where the image processing system 1 aids the user in grasping the color of an image taken by the photographing unit 26, for example, the image taken by the photographing unit 26 corresponds to a "target image". To give another example, in the case where the image processing system 1 aids the user in grasping the color of an image displayed on a Web page, the image displayed on the Web page corresponds to a "target image".

The color information obtaining unit 62 is described. The color information obtaining unit 62 obtains color information of an attention point or an attention area in the target image. The "attention point" or the "attention area" is a point or an area where the user wishes to check the color.

For example, the color information obtaining unit 62 receives the specification of a point or an area in the target image displayed on the display unit 25. The color information obtaining unit 62 then sets the attention point or the attention area based on the point or the area in the target image displayed on the display unit 25 that is specified by the user.

The color information obtaining unit 62 obtains, for example, the color value (for example, RGB value) of the attention point. Alternatively, the color information obtaining unit 62 obtains, as the color value of the attention area, an average value of the color values (for example, RGB values) of pixels in the attention area.

The color information obtaining unit 62 in this embodiment sets, as the attention area, an area within a given distance (e.g., fifteen pixels) from the user's specified point P, and obtains an average value of the color values of pixels in the attention area.

The search unit 64 is described. The search unit 64 searches for an image, which has color information similar to one obtained by the color information obtaining unit 62, from among a plurality of images stored in advance in the database 16 (image storing means). For example, the search unit 64 searches for an image that has a color similar to one obtained by the color information obtaining unit 62. The image found by the search unit 64 is displayed as the reference image 48 on the color check screen 30 as described later.

The similarity information obtaining unit 66 is described. The similarity information obtaining unit 66 obtains similarity information related to the level of similarity between color information of an image stored in the database 16 in advance and the color information obtained by the color information obtaining unit 62.

The similarity information obtaining unit 66 in this embodiment obtains similarity information related to the level of similarity between the color information of the image found by the search unit 64 and the color information obtained by the color information obtaining unit 62 (the color information of the attention point or the attention area).

The notification unit 68 is described. The notification unit 68 makes a notification to the user based on the similarity information obtained by the similarity information obtaining unit 66. For example, the notification unit 68 presents the similarity information obtained by the similarity information obtaining unit 66 to the user.

Along with the similarity information obtained by the similarity information obtaining unit 66, the notification unit 68 presents to the user at least one of the image found by the search unit 64 itself or information related to the image found by the search unit 64.

The notification unit 68 in this embodiment displays the notification field 40 on the color check screen 30. In other words, the notification unit 68 displays an image found by the search unit 64 on the color check screen 30 as the reference image 48. The notification unit 68 also displays a similarity level obtained by the similarity information obtaining unit 66 on the color check screen 30 as the similarity 50.

The image processing system 1 determines to which of a plurality of color groups the color information obtained by the color information obtaining unit 62 belongs. The notification unit 68 presents to the user a color group to which the color information obtained by the color information obtaining unit 62 belongs. The notification unit 68 in this embodiment displays the name of the color group to which the color information obtained by the color information obtaining unit 62 belongs on the color check screen 30 as the color group name 42.

Figure 7:
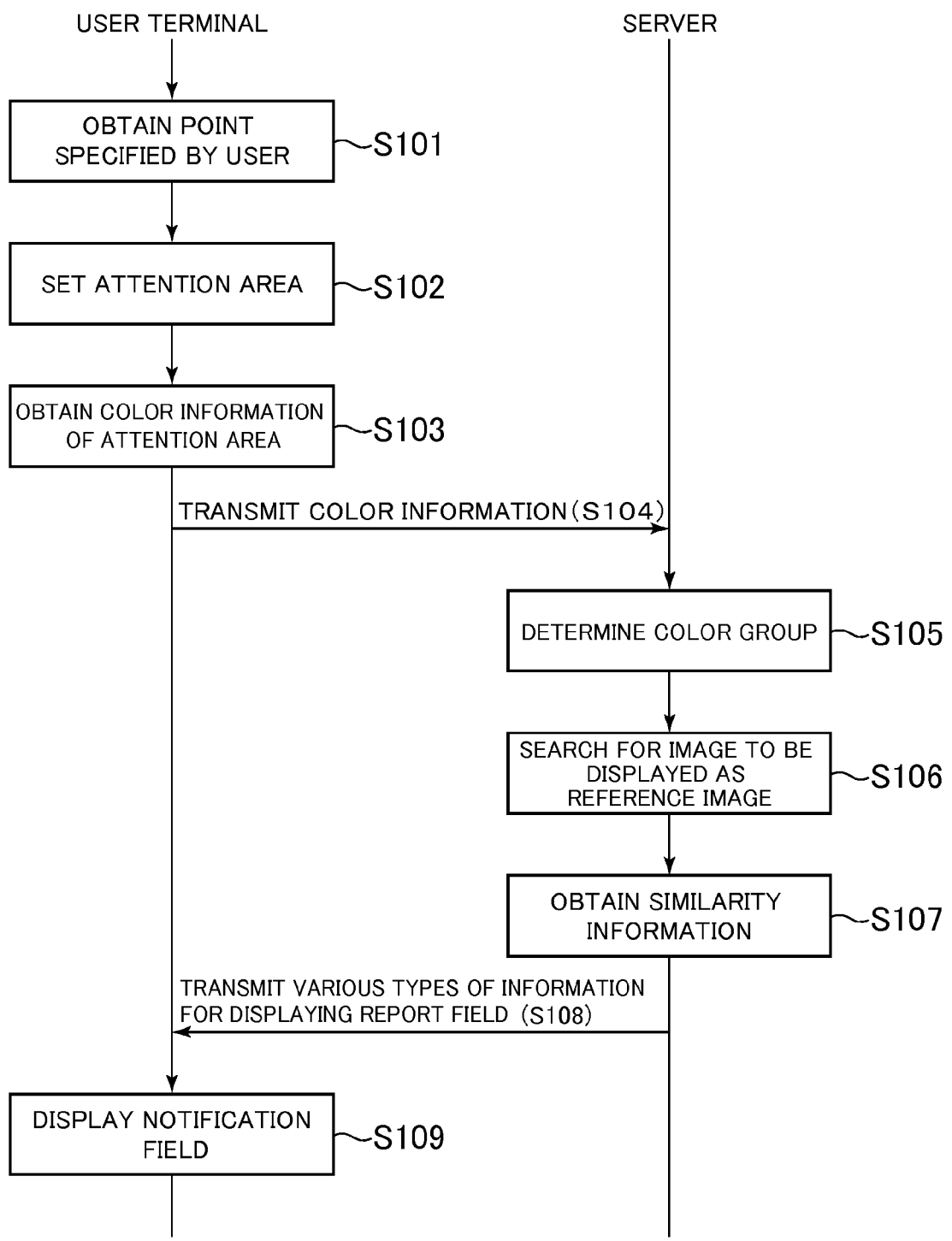
FIG. 7 is a diagram illustrating an example of processing that is executed in the image processing system.

Processing for implementing these function blocks is now described. FIG. 7 is a flow chart illustrating an example of processing that is executed in the image processing system 1 when a point in the color check screen 30 is specified by the user.

When the user specifies a point in the color check screen 30, the control unit 21 of the user terminal 20 obtains the user's specified point P (S101). The control unit 21 obtains the specified point P based on, for example, position information supplied from the touch panel.

After Step S101 is executed, the control unit 21 sets the attention area (S102). The control unit 21 sets, for example, an area within a given distance (e.g., fifteen pixels) from the user's specified point P as the attention area.

After Step S102 is executed, the control unit 21 (the color information obtaining unit 62) obtains color information of the attention area (S103). For example, the control unit 21 obtains an average value of the color values (RGB values) of pixels in the attention area. The control unit 21 transmits the color information obtained in Step S103 to the server 10 (S104).

The server 10 receives the color information transmitted from the user terminal 20, and the control unit 11 of the server 10 determines a color group to which the color information obtained in Step S103 belongs (S105). For example, the control unit 11 calculates, for each of the plurality of color groups, the Euclidean distance between the color value (RGB value) of the representative color of the color group and the color value (RGB value) obtained in Step S103. The control unit 11 determines a color group that has the shortest Euclidean distance as the color group to which the color information obtained in Step S103 belongs.

The control unit 11 searches for an image to be displayed as the reference image 48 from among a plurality of images stored in the database 16 (S106). In other words, the control unit 11 searches for an image whose color information is the same as or similar to the color information obtained in Step S103. Specifically, the control unit 11 searches for an image whose color information is close to the one obtained in Step S103.

For example, the control unit 11 compares, for each of the plurality of images stored in the database 16, the color feature amount of the image (a comparison target image) and the color feature amount of the color information obtained in Step S103 (i.e., the color information of the attention area). For example, a measure called the Earth Mover's Distance (EMD) is used in the comparison in the color feature amount.

The EMD is a measure based on the solution of a transportation problem. The "transportation problem" is a problem in which a minimum value of the total cost of transportation between transportation sources and transportation destinations is obtained in a case where the distribution of transportation sources (p) and transportation source demands ($w_p$) is given as $P=\{(p_1, w_{p1}) (p_2, w_{p2}), \ldots (P_m, w_{pm})\}$, the distribution of transportation destinations (q) and transportation destination demands ($w_q$) is given as $Q=\{q_1, w_{q1}) (q_2, w_{q2}), \ldots (q_n, w_{qn})\}$, and the cost of transportation between a transportation source $p_i$ ($1 \leq i \leq m$) and a transportation destination $q_j$ ($1 \leq j \leq n$) is given as $d_{ij}$. Specifically, a minimum value of a function expressed by the following Expression (1) is obtained in the transportation problem. However, constraints expressed by the following Expressions (2) to (5) need to be satisfied in a case of obtaining the minimum value of the function expressed by Expression (1).

[Mathematical Expression 1]

$$WORK(P, Q, F) = \sum_{i=1}^{m} \sum_{j=1}^{n} f_{ij} d_{ij} \quad (1)$$

$$f_{ij} \geq 0 \quad 1 \leq i \leq m, 1 \leq j \leq n \quad (2)$$

$$\sum_{j=1}^{n} f_{ij} \leq w_{pi} \quad 1 \leq i \leq m \quad (3)$$

$$\sum_{i=1}^{m} f_{ij} \leq w_{qj} \quad 1 \leq j \leq n \quad (4)$$

$$\sum_{i=1}^{m} \sum_{j=1}^{n} f_{ij} = \min\left(\sum_{i=1}^{m} w_{pi}, \sum_{j=1}^{n} w_{qj}\right) \quad (5)$$

Expression (2) indicates that the quantity of one-way transportation from the transportation source $p_i$ to the transportation destination $q_j$ has a positive value. Expression (3) indicates that a quantity that exceeds the demand $w_{pi}$ of the transportation source $p_i$ cannot be transported. Expression (4) indicates that a quantity that exceeds the demand $w_{qj}$ of the transportation destination $q_j$ cannot be accepted. Expression (5) indicates an upper limit to the total transportation quantity, and indicates that the total transportation quantity is limited to the smaller one of the sum of transportation source demands and the sum of transportation destination demands.

In this case, the EMD between P and Q is expressed by the following Expression (6).

[Mathematical Expression 2]

$$EMD(P, Q) = \frac{\sum_{i=1}^{m} \sum_{j=1}^{n} f_{ij} d_{ij}}{\sum_{i=1}^{m} \sum_{j=1}^{n} f_{ij}} \quad (6)$$

In this embodiment, the distribution of the color feature amount of the color information obtained in Step S103 (i.e., the color information of the attention area) corresponds to the distribution P. The distribution P accordingly has only one color feature amount.

The distribution of the color feature amount of a comparison target image (one of images stored in the database 16) in this embodiment corresponds to the distribution Q. More specifically, the distribution of the color feature amount of n colors of the comparison target image reduced to n colors corresponds to the distribution Q. The color feature amount of n colors of the comparison target image reduced to n colors is obtained from the "color feature amount" field of the image table.

In Step S106, the EMD between the above-described distributions P and Q is calculated for each of the plurality of images stored in the database 16. A given number of images (three images in this embodiment) are selected in ascending order of EMD, as images to be displayed as the reference images 48, from the plurality of images stored in the database 16.

The method of searching for an image whose color information is the same as or similar to the color information obtained in Step S103 is not limited to the one described above, and various methods can be employed.

After Step S106 is executed, the control unit 11 (the similarity information obtaining unit 66) obtains similarity information related to the level of similarity between the color information obtained in step S103 and color information of the image found in Step S106 (S107). For example, the control unit 11 obtains as the similarity information a value obtained by converting the EMD into a percentage.

The control unit 11 may obtain the level of similarity between the color value (RGB value) obtained in Step S103 and the color value (RGB value) of the representative color of the image found in Step S106 as the similarity information. To calculate the level of similarity between color values (RGB values), the color values (RGB values) are regarded as vectors, and the cosine of an angle formed between the two vectors is calculated and used as the level of similarity. In this case, however, it is necessary to be able to specify a representative color for each image stored in the database 16.

Thereafter, the control unit 11 (the notification unit 68) transmits various types of information necessary to display the notification field 40 to the user terminal 20 (S108). For example, the control unit 11 transmits to the user terminal 20 the following information.

Color group information that indicates the color group determined in Step S105

Reference image information (e.g., link information) related to the image found in Step S106

The similarity information obtained in Step S107

The user terminal 20 receives this information transmitted from the server 10, and the control unit 21 of the user terminal 20 displays the notification field 40 on the color check screen 30 based on the information (S109). For example, the control unit 21 displays the color group name 42 in the notification field 40 based on the color group information received from the server 10. The control unit 21 also displays the marker 46 on the color map 44 in the notification field 40 based on the color information obtained in Step S103. The control unit 21 further displays the reference images 48 and the similarity 50 in the notification field 40 based on the reference image information and similarity information received from the server 10.

The image processing system 1 according to the first embodiment described above displays the notification field 40 on the color check screen 30. The image processing system 1 according to the first embodiment is capable of aiding a user in grasping the color of an image (e.g., the piece of clothing 32) that is displayed on the color check screen 30.

Second Embodiment

A second embodiment of the present invention is described next. The image processing system 1 according to the second embodiment has the same overall configuration as in the first embodiment (see FIG. 1).

The image processing system 1 according to the second embodiment differs from the first embodiment in that users are allowed to register images in the database 16 at their discretion.

Steps taken by a user to register an arbitrary image in the database 16 are described. Described here is a case where the user registers an image of a piece of clothing that the user owns in the database 16.

To register an image of a piece of clothing owned by the user in the database 16, the user takes a picture of the piece of his/her clothing with the use of the photographing unit 26. Alternatively, the user obtains an image of a piece of clothing owned by the user from a Web page where an image of the piece of clothing is shown. The user then specifies the clothing image as a registration target image (i.e., an image to be registered in the database 16). When an arbitrary image is specified as the registration target image, a registration screen for registering the image in the database 16 is displayed on the display unit 25 of the user terminal 20.

Figures 8, 9:
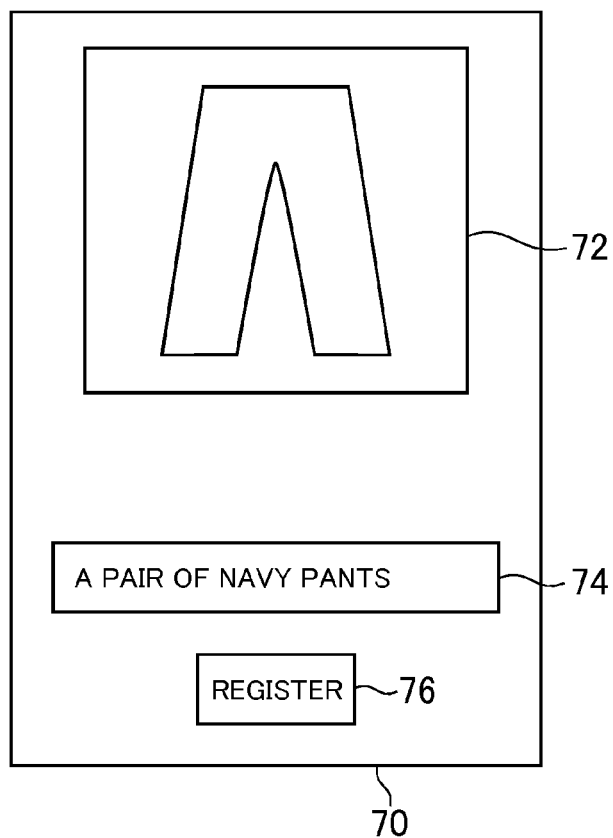
FIG. 8 is a schematic diagram illustrating an example of a registration screen.
FIG. 9 is a diagram showing another example of the image table.

FIG. 8 illustrates an example of the registration screen. As illustrated in FIG. 8, the registration screen 70 includes a registration target image field 72, a description field 74, and a "register" button 76. An image that the user wishes to register in the database 16 (a registration target image) is displayed on the registration target image field 72. The description field 74 is a field for entering a descriptive text related to the registration target image.

On the registration screen 70, the user enters a descriptive text related to the registration target image in the description field 74, and then presses the "register" button 76. With the press of the "register" button 76, a combination of the user ID, the registration target image, and the descriptive text entered in the description field 74 is transmitted to the server 10.

The server 10 saves the registration target image transmitted from the user terminal 20 in the database 16. The server 10 also registers information related to the image in an image table.

FIG. 9 shows an example of the image table in the second embodiment. The image table of FIG. 9 includes an "ID" field, an "image" field, a "type" field, a "registering user" field, a "description" field, and a "color feature amount" field. The "ID", "image", "description", and "color feature amount" fields are the same as those in the image table of the first embodiment (see FIG. 5).

The "type" field indicates whether or not the image is one registered by a user. One of a value "0" and a value "1", for example, is registered in the "type" field. The value "0" indicates that the image is not one registered by the user. In other words, the value "0" indicates that the image is one registered in advance by the developer or administrator of the image processing system 1. As same as in the first embodiment, in the second embodiment, images that lead a user to picture colors are registered in the database 16 in advance by the developer or administrator of the image processing system 1. The value "0" indicates that the image is one of such images. The value "1", on the other hand, indicates that the image is one registered by the user. The "registering user" field indicates the user ID of the user who has registered the image.

When information related to the registration target image that is transmitted from the user terminal 20 is newly registered in the image table, a new record is added to the image table. In the new record, an image ID determined for the registration target image is registered in the "ID" field, and link information of the registration target image is registered in the "image" field.

The value "1" is further registered in the "type" field. The user ID and the descriptive text that are received from the user terminal 20 along with the registration target image are registered in the "registering user" field and the "description" field, respectively. The color feature amount of the registration target image is also registered in the "color feature amount" field. For example, a image obtained by reducing the registration target image to n colors is separately generated, the color feature amount of n colors is obtained for the reduced image, and the thus obtained color feature amount is registered in the "color feature amount" field.

As same as the first embodiment, the image processing system 1 according to the second embodiment has a function for aiding a user in checking the color of an image as in the first embodiment. In other words, the color check screen 30 illustrated in FIG. 3, for example, is displayed in the image processing system 1 according to the second embodiment as well.

The image processing system 1 according to the second embodiment allows the user to register an arbitrary image in the database 16 as described above. An image registered in the database 16 by the user is consequently displayed in the notification field 40 as the reference image 48. Specifically, out of images registered by the user in the database 16, an image that has a color close to the color of the user's specified point P is displayed as the reference image 48. For instance, when images of pieces of clothing owned by the user are stored in the database 16, an image of a piece of clothing that has a color close to the color of the specified point P is displayed as the reference image 48. This makes it even more easier for the user to grasp the color of the image displayed on the color check screen 30.

In the second embodiment, a descriptive text of the reference image 48 may be displayed instead of displaying the reference image 48 itself. For instance, a descriptive text such as "a pair of navy pants" may be displayed instead of displaying an image of a pair of navy pants that the user owns as the reference image 48. Because the pair of navy pants is owned by the user, the user can picture the color even though only its descriptive text is displayed.

The same function blocks as those in the first embodiment are implemented by the image processing system 1 according to the second embodiment (see FIG. 6). The same processing as the one in the first embodiment is executed in the image processing system 1 according to the second embodiment (see FIG. 7).

However, a combination of a user ID and the color information obtained in Step S103 is transmitted to the server 10 in Step S104 of FIG. 7.

In Step S106, an image having color information that is the same as or similar to the color information obtained in Step S103 is searched for from among images stored in the database 16 that satisfy one of the following conditions (A1) and (A2). Specifically, an image having color information close to the color information obtained in Step S103 is searched for from among images that satisfy one of the following conditions (A1) and (A2).

(A1) The value "0" is registered in the "type" field.

(A2) The user ID received in Step S104 is registered in the "registering user" field.

In the image processing system 1 according to the second embodiment, an image registered by a user himself/herself is displayed as the reference image 48. Therefore, the image processing system 1 according to the second embodiment makes it even more easier for the user to grasp the color of an image (e.g., the piece of clothing 32) that is displayed on the color check screen 30.

While the database 16 in the description given above stores images prepared in advance by the developer or administrator of the image processing system 1 as well, images prepared in advance by the developer or administrator of the image processing system 1 may not be stored in the database 16. In short, only images registered by users may be stored in the database 16.

Third Embodiment

A third embodiment of the present invention is described next. The image processing system 1 according to the third embodiment has the same overall configuration as in the first embodiment (see FIG. 1).

The image processing system 1 according to the third embodiment presents to a user an image having a color that goes well with the color of an image displayed on the color check screen 30. The image processing system 1 according to the third embodiment differs from the first embodiment and the second embodiment in this regard.

The following description of the image processing system 1 according to the third embodiment discusses a case of presenting to the user a piece of clothing that is owned by the user and that goes well in color with the color of an image (the piece of clothing 32) displayed on the color check screen 30.

In the third embodiment, the user registers in advance images of pieces of clothing that the user owns in the database 16. Steps taken by the user to register an image of a piece of clothing that the user owns in the database 16 are described. To register an image of a piece of clothing owned by the user in the database 16, the user takes a picture of the piece of his/her clothing with the use of the photographing unit 26. Alternatively, the user obtains an image of a piece of clothing owned by the user from a Web page or the like where an image of the piece of clothing is shown. The user then specifies the clothing image as a registration target image (i.e., an image to be registered in the database 16). When a clothing image is specified as the registration target image, a registration screen for registering the clothing image in the database 16 is displayed on the display unit 25.

Figures 10, 11:
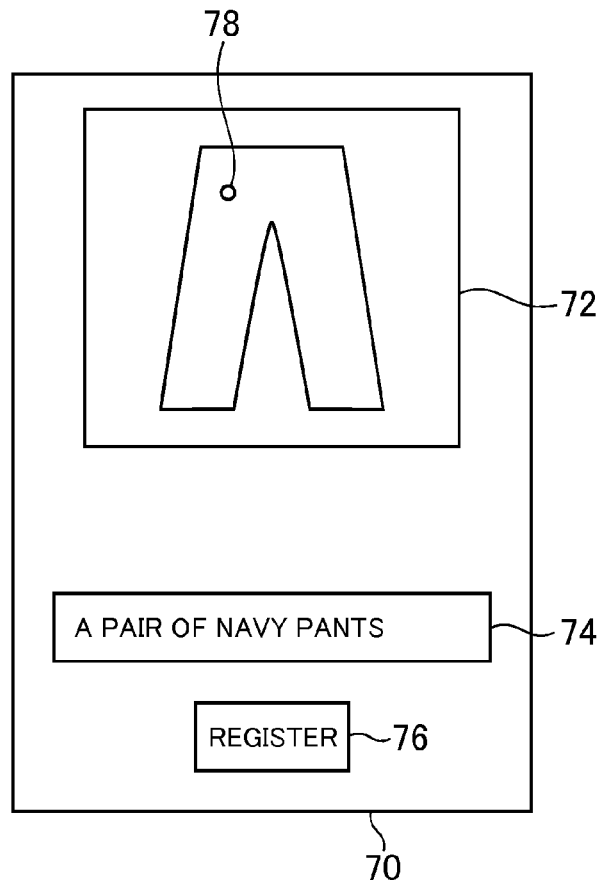
FIG. 10 is a diagram illustrating another example of the registration screen.
FIG. 11 is a diagram showing still another example of the image table.

FIG. 10 illustrates an example of the registration screen. As illustrated in FIG. 10, the registration screen 70 includes a registration target image field 72, a description field 74, and a "register" button 76. The registration target image field 72, the description field 74, and the "register" button 76 are the same as in the registration screen 70 of the second embodiment (see FIG. 8).

On the registration screen 70, the user specifies a representative point in the piece of clothing. The color at a point specified as the representative point by the user is registered as the color of the piece of clothing as described later. When a representative point is specified by the user, a marker 78 which indicates the representative point is displayed. The user also enters a descriptive text related to the piece of clothing in the description field 74, and then presses the "register" button 76. With the press of the "register" button 76, a combination of the user ID, the registration target image, color information of the point specified as the representative point, and the descriptive text entered in the description field 74 is transmitted to the server 10. While the representative point is specified by the user here, the representative point may be determined automatically.

The server 10 receives the combination of pieces of information and saves the registration target image transmitted from the user terminal 20 in the database 16. The server 10 also registers information related to the image in an image table.

FIG. 11 illustrates an example of the image table in the third embodiment. The image table of FIG. 11 includes an "ID" field, an "image" field, a "type" field, a "registering user" field, a "description" field, a "color" field, and a "color feature amount" field. The "ID", "image", "type", "registering user", "description", and "color feature amount" fields are the same as those in the image table of the second embodiment (see FIG. 9).

The "color" field indicates the color of a piece of clothing photographed in the image. For example, the color group ID of a color group to which the color at a point specified as the representative point of the piece of clothing belongs is registered in the "color" field. The color value (for example, RGB value) of the point specified as the representative point of the piece of clothing may be registered in the "color" field instead.

As same as the first embodiment and the second embodiment, the image processing system 1 according to the third embodiment has a function for aiding a user in checking the color of an image. In other words, the color check screen 30 is displayed in the image processing system 1 according to the third embodiment as well.

Figure 12:
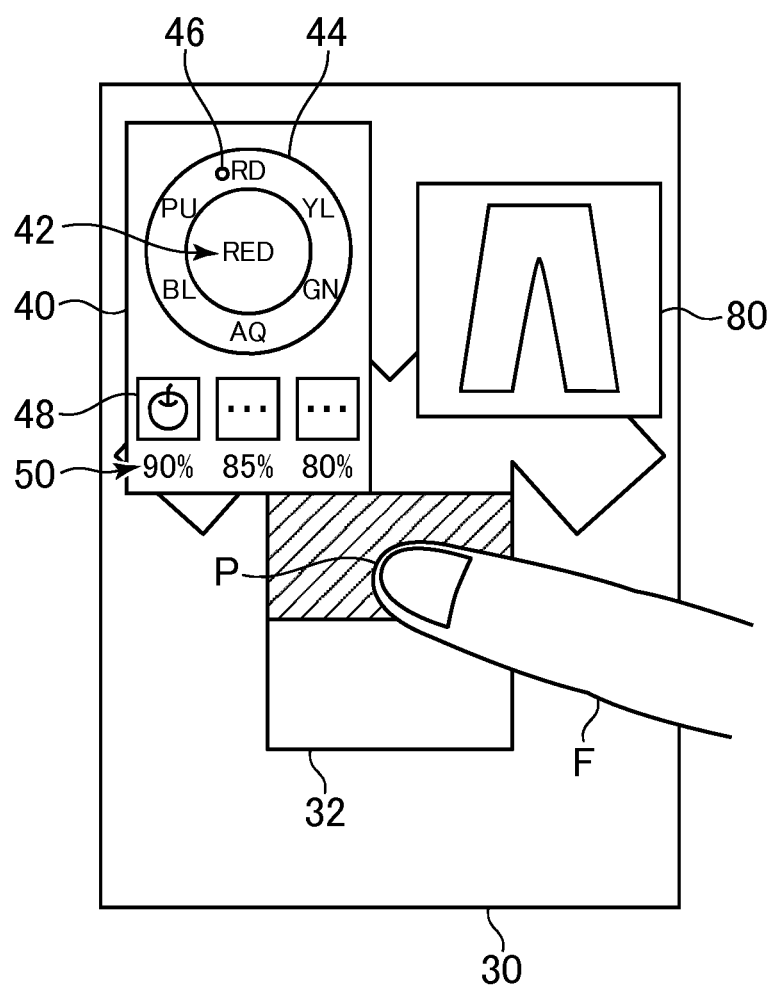
FIG. 12 is a diagram illustrating another example of the color check screen.

FIG. 12 illustrates an example of the color check screen 30 in the third embodiment. The notification field 40 is the same as in the first embodiment (see FIG. 3).

As illustrated in FIG. 12, a recommendation image 80 is displayed on the color check screen 30 in the third embodiment. Specifically, in the case where an image of a piece of clothing that goes well in color with the color of a clothing image displayed on the color check screen 30 (the color of the user's specified point P) is included in clothing images registered in the database 16 by the user, such an image is displayed as the recommendation image 80. While only one recommendation image 80 is displayed in the example of FIG. 12, a plurality of recommendation images 80 may be displayed.

In the image processing system 1 according to the third embodiment, the recommendation image 80 is displayed. Therefore, the image processing system 1 according to the third embodiment enables a user to know which of pieces of clothing owned by the user goes well in color with the color of a clothing image displayed on the color check screen 30.

Figures 13, 14:
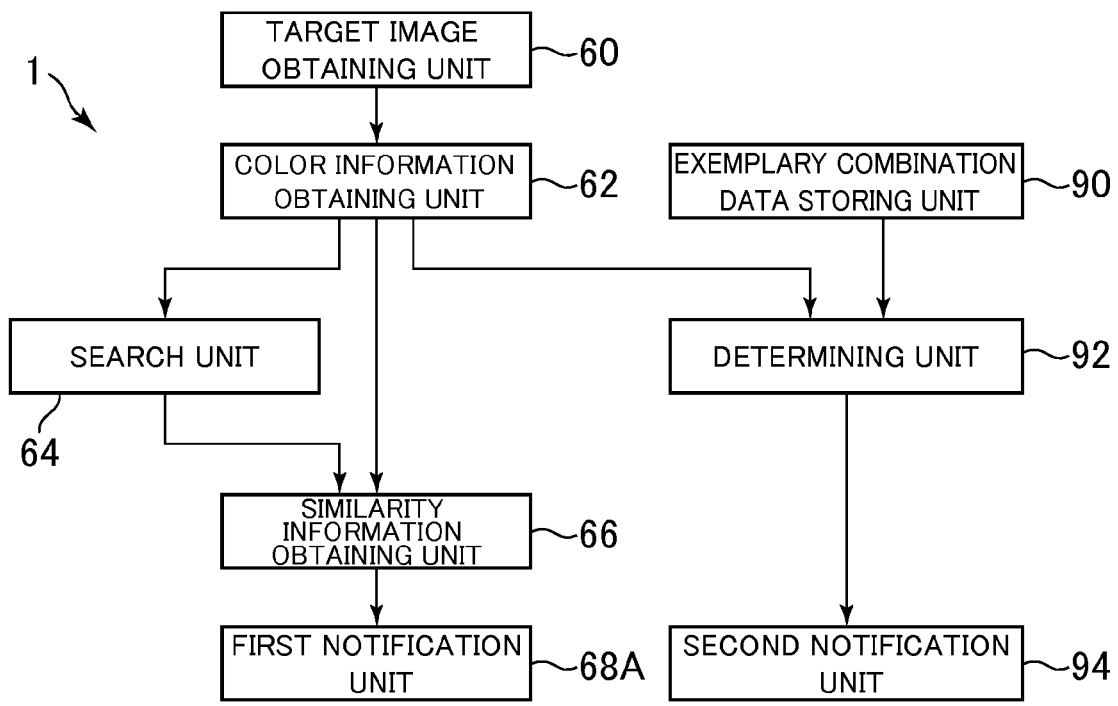
FIG. 13 is a functional block diagram illustrating another example of the functions that are implemented in the image processing system.
FIG. 14 is a diagram showing an example of exemplary combination data.

Components for implementing the function described above are described. FIG. 13 is a functional block diagram illustrating function blocks that are relevant to the present invention out of function blocks implemented in the image processing system 1 according to the third embodiment. As illustrated in FIG. 13, the image processing system 1 includes a target image obtaining unit 60, a color information obtaining unit 62, a search unit 64, a similarity information obtaining unit 66, a first notification unit 68A, an exemplary combination data storing unit 90, a determining unit 92, and a second notification unit 94.

The target image obtaining unit 60, the color information obtaining unit 62, the search unit 64, and the similarity information obtaining unit 66 are the same as those in the first embodiment (see FIG. 6). The first notification unit 68A is the same as the notification unit 68 in the first embodiment (see FIG. 6). A description on these function blocks is omitted here.

The exemplary combination data storing unit 90, the determining unit 92, and the second notification unit 94 are implemented in the server 10 or the user terminal 20. For example, the exemplary combination data storing unit 90 is implemented by the database 16 or the auxiliary storage unit 13. The determining unit 92 and the second notification unit 94 are implemented by the server 10. Specifically, the control unit 11 of the server 10 executes processing according to a program, thereby functioning as the determining unit 92 and the second notification unit 94.

The exemplary combination data storing unit 90 is described. The exemplary combination data storing unit 90 stores exemplary combination data related to exemplary combinations of color information. In other words, the exemplary combination data is data that indicates combinations of colors that go well together.

FIG. 14 shows an example of the exemplary combination data. The exemplary combination data of FIG. 14 indicates combinations of color groups that go well together. The exemplary combination data may instead be data that uses a color value (for example, the RGB value) to indicate combinations of colors that go well together.

The determining unit 92 is described. The determining unit 92 determines whether or not the combination of color information of an image that is stored in the database 16 (image storing means) and the color information that is obtained by the color information obtaining unit 62 is an exemplary combination based on the exemplary combination data.

For example, the determining unit 92 determines whether or not the combination of a color group to which the color information of the image stored in the database 16 belongs and a color group to which the color information obtained by the color information obtaining unit 62 belongs is an exemplary combination.

The second notification unit 94 is described. The second notification unit 94 makes a notification to the user when it is determined that the combination of the color information of the image that is stored in the database 16 and the color information that is obtained by the color information obtaining unit 62 is the exemplary combination.

For example, when it is determined that the combination of the color information of the image that is stored in the database 16 and the color information that is obtained by the color information obtaining unit 62 is the exemplary combination, the second notification unit 94 presents the image to the user. The second notification unit 94 presents to the user the image as, for example, the recommendation image 80 as illustrated in FIG. 12.

Alternatively, when it is determined that the combination of the color information of the image that is stored in the database 16 and the color information that is obtained by the color information obtaining unit 62 is the exemplary combination, the second notification unit 94 may present information related to the image to the user. For instance, the second notification unit 94 may present a descriptive text related to the image to the user.

Figure 15:
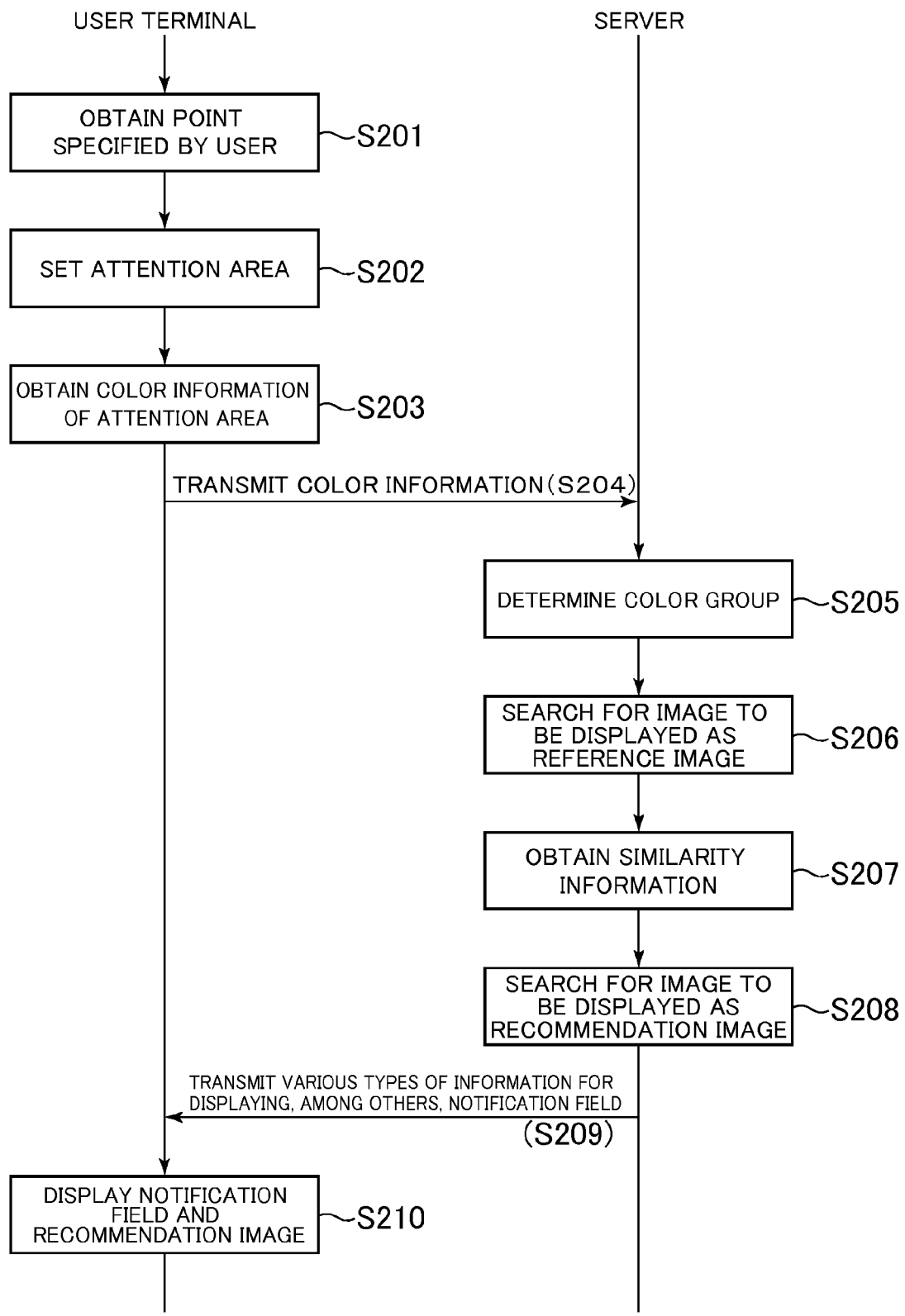
FIG. 15 is a diagram illustrating another example of processing that is executed in the image processing system.

An example of processing that is executed in the image processing system 1 according to the third embodiment is described next. FIG. 15 is a flowchart illustrating an example of processing that is executed in the image processing system 1 when a point in the color check screen 30 is specified by the user.

Steps S201 to S207 in FIG. 15 are the same as Steps S101 to S107 in FIG. 7. However, in Step S204, a user ID is transmitted to the server 10 along with color information.

After Step S207 is executed, the control unit 11 of the server 10 searches for an image to be displayed as the recommendation image 80 from among a plurality of images stored in the database 16 (S208). For example, the control unit 11 searches for an image that satisfies all of the following conditions (B1) to (B3).

(B1) The value "1" is registered in the "type" field.
(B2) The user ID received in Step S204 is registered in the "registering user" field.
(B3) The combination of a color group determined in Step S205 and a color group registered in the "color" field is an exemplary combination.

In the case where all of conditions (B1) to (B3) are satisfied by a plurality of images, one of those images is selected. Note that a plurality of recommendation images 80 may be displayed on the color check screen 30. In this case, the control unit 11 selects a plurality of images from among images that satisfy all of conditions (B1) to (B3).

Conditions related to clothing categories may be added to conditions (B1) to (B3) given above. For example, when the image displayed on the color check screen 30 is a top wear image (i.e., when the category of the piece of clothing 32 is "top wear"), a condition "the category of the piece of clothing photographed in the image is 'bottom wear'" may be set as condition (B4). Similarly, when the image displayed on the color check screen 30 is a bottom wear image (i.e., when the category of the piece of clothing 32 is "bottom wear"), a condition "the category of the piece of clothing photographed in the image is 'top wear'" may be set as condition (B4).

In this case, however, category information needs to be stored in association with images stored in the database 16. For example, a "category" field which indicates the category of the subject (a piece of clothing) photographed in the image needs to be added to the image table. The category of the subject photographed in an image that is displayed on the color check screen 30 (the piece of clothing 32) also needs to be input by the user or determined automatically.

After Step S208 is executed, the control unit 11 transmits various types of information necessary to display the notification field 40 and the recommendation image 80 to the user terminal 20 (S209). For example, the control unit 11 transmits to the user terminal 20 the following information.

Color group information that indicates the color group determined in Step S205
Reference image information (e.g., link information) related to the image found in Step S206
The similarity information obtained in Step S207
Recommendation image information (e.g., link information) related to the image found in Step S208

The user terminal 20 receives this information transmitted from the server 10, and the control unit 21 of the user terminal 20 displays the notification field 40 and the recommendation image 80 on the color check screen 30 based on the information (S210).

For example, the control unit 21 displays the color group name 42 in the notification field 40 based on the color group information received from the server 10. The control unit 21 also displays the marker 46 on the color map 44 in the notification field 40 based on the color information obtained in Step S203. The control unit 21 further displays the reference images 48 and the similarity 50 in the notification field 40 based on the reference image information and similarity information received from the server 10. The control unit 21 also displays the recommendation image 80 on the color check screen 30 based on the recommendation image information received from the server 10.

The image processing system 1 according to the third embodiment described above is capable of aiding a user in knowing, for example, a piece of clothing that is owned by the user and that goes well in color with the color of the piece of clothing 32 displayed on the color check screen 30.

Fourth Embodiment

A fourth embodiment of the present invention is described next. The image processing system 1 according to the fourth embodiment has the same overall configuration as in the first embodiment (see FIG. 1).

The image processing system 1 according to the fourth embodiment is in common with the third embodiment in that a user is aided in knowing an image whose color goes well with the color of an image that is displayed on the color check screen 30.

In the image processing system 1 according to the fourth embodiment, however, the user selects, in advance, as abase image, one of a plurality of images stored in the database 16. The image processing system 1 makes a notification to the user when the color of the base image and the color of an image displayed on the color check screen 30 go well together. The image processing system 1 according to the fourth embodiment differs from the third embodiment in this regard.

The following description of the image processing system 1 according to the fourth embodiment discusses a case in which a user is aided in knowing a piece of clothing that is owned by the user and that goes well in color with the color of the piece of clothing 32 displayed on the color check screen 30.

As same as in the third embodiment, in the image processing system 1 according to the fourth embodiment, the user registers in advance images of pieces of clothing that the user owns in the database 16. Steps taken by the user to register an arbitrary clothing image in the database 16 are the same as in the third embodiment.

Figures 16, 17:
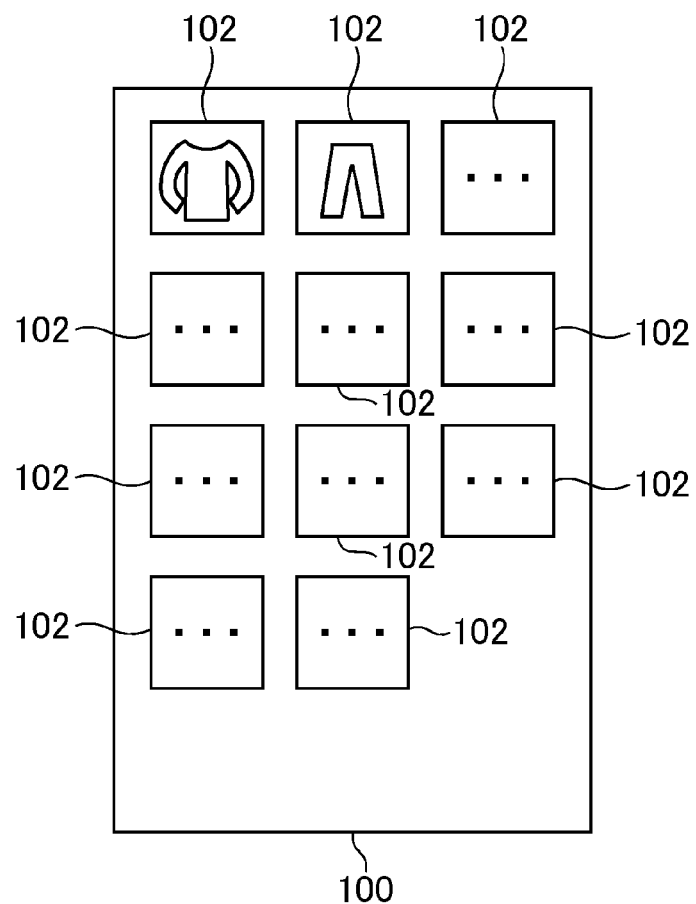
FIG. 16 is a diagram showing yet still another example of the image table.
FIG. 17 is a diagram illustrating an example of a selection screen.

FIG. 16 illustrates an example of the image table in the fourth embodiment. The image table of FIG. 16 includes an "ID" field, an "image" field, a "type" field, a "registering user" field, a "description" field, a "color" field, a "color feature amount" field, and a "selection status" field. The "ID", "image", "type", "registering user", "description", "color", and "color feature amount" fields are the same as those in the image table of the third embodiment (see FIG. 11).

The "selection status" field indicates whether or not the image is selected by the user as the base image. For example, one of a value "0" and a value "1" is registered in the "selection status" field. The value "0" indicates that the image is not selected as the base image, and the value "1" indicates that the image is selected as the base image.

Steps taken by the user to select, as the base image, one of the user's clothing images stored in the database 16 are described.

When selecting the base image, a selection screen for selecting the base image is displayed on the display unit 25 of the user terminal 20. FIG. 17 illustrates an example of the selection screen. As illustrated in FIG. 17, a list of the user's clothing images 102 stored in the database 16 is displayed on the selection screen 100. The user selects one of the clothing images 102 displayed on the selection screen 100 as the base image.

When one of the clothing images 102 displayed on the selection screen 100 is selected, the combination of the user ID and the image ID of the selected clothing image is transmitted to the server 10. The server 10 receives the combination and updates the image table. First, the value of the "selection status" field is initialized to "0" in a record where the received user ID is registered in the "registering user" field. Thereafter, the value of the "selection status" field is updated with "1" in a record where the received image ID is registered in the "ID" field.

Figure 18:
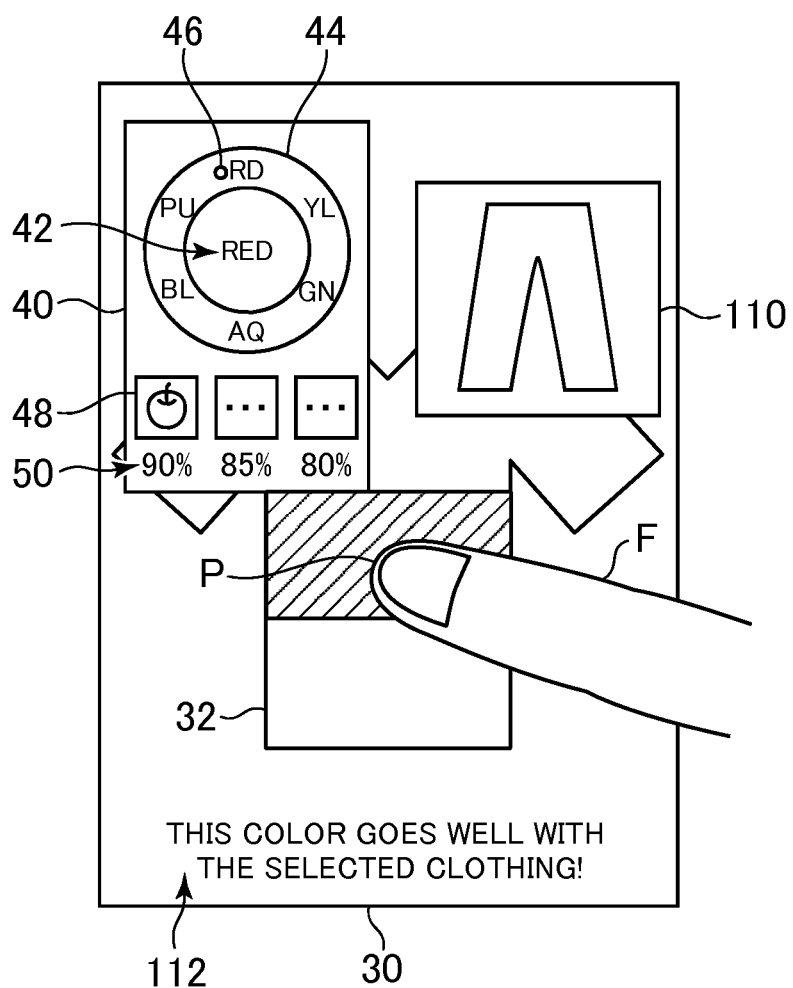
FIG. 18 is a diagram illustrating still another example of the color check screen.

The color check screen 30 is displayed in the image processing system 1 according to the fourth embodiment, too. FIG. 18 illustrates an example of the color check screen 30 in the fourth embodiment. As illustrated in FIG. 18, a notification field 40, a base image 110, and a message 112 are displayed on the color check screen 30 in the fourth embodiment. The notification field 40 is the same as in the first embodiment (see FIG. 3).

The base image 110 is an image selected as the base image on the selection screen 100. The message 112 is a message informing the user of the fact that the color of the image selected as the base image and the color of the user's specified point P go well together.

The base image 110 and the message 112 are displayed when the color of the base image and the color of the user's specified point P go well together. In other words, the base image 110 and the message 112 are not displayed when the colors do not go well together.

The image processing system 1 according to the fourth embodiment enables a user to know that the color of the base image and the color of an image displayed on the color check screen 30 go well together by displaying the base image 110 and the message 112. For example, the user can know that the color of a piece of clothing photographed in the base image and the color of the piece of clothing 32 displayed on the color check screen 30 go well together.

The same function blocks as those in the third embodiment are implemented in the image processing system 1 according to the fourth embodiment (see FIG. 13). The function blocks implemented in the image processing system 1 according to the fourth embodiment are therefore described with reference to FIG. 13. The target image obtaining unit 60, the color information obtaining unit 62, the search unit 64, the similarity information obtaining unit 66, the first notification unit 68A, and the exemplary combination data storing unit 90 are the same as those in the third embodiment. A description on these function blocks is omitted here.

The determining unit 92 is described. The determining unit 92 determines whether or not the combination of color information of the base image and the color information that is obtained by the color information obtaining unit 62 is the exemplary combination.

For example, the determining unit 92 determines whether or not the combination of a color group to which the color information of the base image belongs and a color group to which the color information obtained by the color information obtaining unit 62 belongs is the exemplary combination.

The second notification unit 94 is described. The second notification unit 94 makes a notification to the user when it is determined that the combination of the color information of the base image and the color information that is obtained by the color information obtaining unit 62 is the exemplary combination. For example, the second notification unit 94 displays the base image 110 and the message 112 on the color check screen 30 as illustrated in FIG. 18.

Displaying both of the base image 110 and the message 112 on the color check screen 30 is not necessary, and the second notification unit 94 may display only one of the base image 110 and the message 112 on the color check screen 30. Instead of displaying the base image 110 or the message 112 on the color check screen 30, the second notification unit 94 may display a given image (for example, an icon) on the color check screen 30 or may apply a given effect on the color check screen 30.

Figure 19:
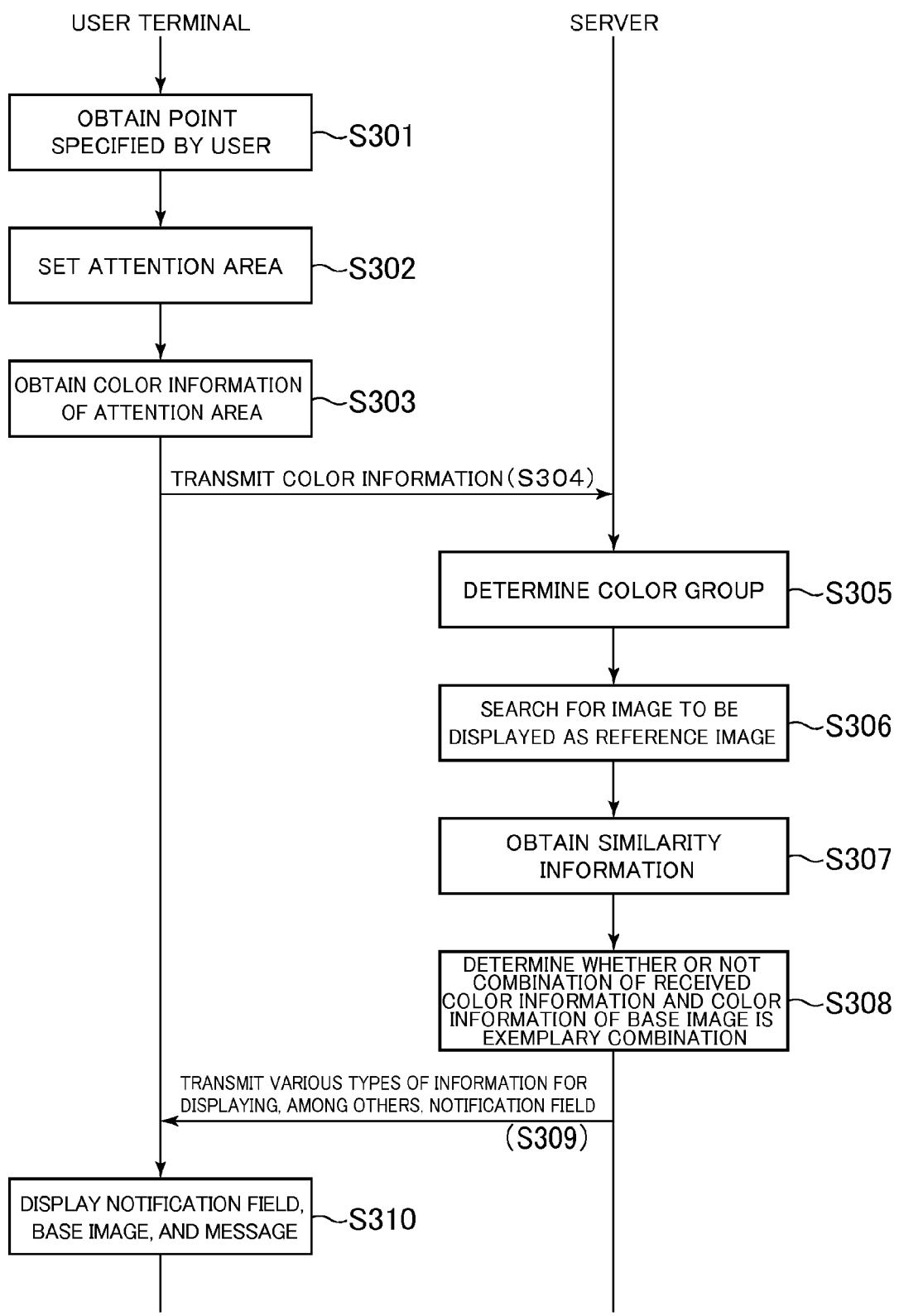
FIG. 19 is a diagram illustrating still another example of processing that is executed in the image processing system.

An example of processing that is executed in the image processing system 1 according to the fourth embodiment is described next. FIG. 19 is a flowchart illustrating an example of processing that is executed in the image processing system 1 when a point in the color check screen 30 is specified by the user.

Steps S301 to S307 in FIG. 19 are the same as Steps S101 to S107 in FIG. 7. However, in Step S304, the user ID is transmitted to the server 10 along with the color information.

After Step S307 is executed, the control unit 11 of the server 10 determines whether or not the combination of color information of the image selected as the base image and the color information obtained in Step S303 is the exemplary combination (S308).

For example, the control unit 11 determines whether or not the combination of a color group to which the color of the image selected as the base image belongs and the color group determined in Step S305 is the exemplary combination. The "color group to which the color of the image selected as the base image belongs" is a color group registered in the "color" field of the image table.

After Step S308 is executed, the control unit 11 transmits various types of information necessary to display the notification field 40, the base image 110, and the message 112 to the user terminal 20 (S309). For example, the control unit 11 transmits to the user terminal 20 the following information.

Color group information that indicates the color group determined in Step S305

Reference image information (e.g., link information) related to the image found in Step S306

The similarity information obtained in Step S307 and base image information (e.g., link information) related to the image selected as the base image Determination result information related to the result of the determination in Step S308, or message information based on the result of the determination in Step S308

The user terminal 20 receives this information transmitted from the server 10, and the control unit 21 of the user terminal 20 displays the notification field 40, the base image 110, and the message 112 on the color check screen 30 based on the information (S310).

For example, the control unit 21 displays the color group name 42 in the notification field 40 based on the color group information received from the server 10. The control unit 21 also displays the marker 46 on the color map 44 in the notification field 40 based on the color information obtained in Step S303. The control unit 21 further displays the reference images 48 and the similarity 50 in the notification field 40 based on the reference image information and similarity information received from the server 10.

The control unit 21 also displays the base image 110 on the color check screen 30 based on the base image information received from the server 10. The control unit 21 further displays the message 112 on the color check screen 30 based on the determination result information (or message information) received from the server 10.

The image processing system 1 according to the fourth embodiment described above is capable of aiding a user in knowing, for example, a piece of clothing that is owned by the user and that goes well in color with the color of the piece of clothing 32 displayed on the color check screen 30.

In the image processing system 1 according to the fourth embodiment, clothing categories may be taken into account. For example, in the case where a top wear image is selected as the base image, the base image 110 and the message 112 may be displayed only when an image displayed on the color check screen 30 is a bottom wear image (in other words, when the category of the piece of clothing 32 is "bottom wear"). Similarly, in the case where a bottom wear image is selected as the base image, the base image 110 and the message 112 may be displayed only when an image displayed on the color check screen 30 is a top wear image (in other words, when the category of the piece of clothing 32 is "top wear").

In this case, however, category information needs to be stored in association with images stored in the database 16. For example, a "category" field which indicates the category of the subject (a piece of clothing) photographed in the image needs to be added to the image table. The category of the subject photographed in an image that is displayed on the color check screen 30 (the piece of clothing 32) also needs to be input by the user or determined automatically.

Fifth Embodiment

A fifth embodiment of the present invention is described next. The image processing system 1 according to the fifth embodiment has the same overall configuration as in the first embodiment (see FIG. 1).

As same as in the fourth embodiment, in the image processing system 1 according to the fifth embodiment, a user selects, in advance, as a base image, one of a plurality of images stored in the database 16. The image processing system 1 according to the fifth embodiment, in particular, makes a notification to the user based on the level of similarity between the color of the image selected as the base image and the color of the image displayed on the color check screen 30. The image processing system 1 according to the fifth embodiment differs from the first to fourth embodiments in this regard.

As described above, the user selects, in advance, as the base image, one of a plurality of images stored in the database 16 in the image processing system 1 according to the fifth embodiment. Steps taken by the user to select the base image are the same as in the fourth embodiment (see FIG. 17).

In the fifth embodiment, the database 16 may store only images that are registered in advance by the developer or administrator of the image processing system 1, may store only arbitrary images registered by users, or may store both of the former and the latter.

Figure 20:
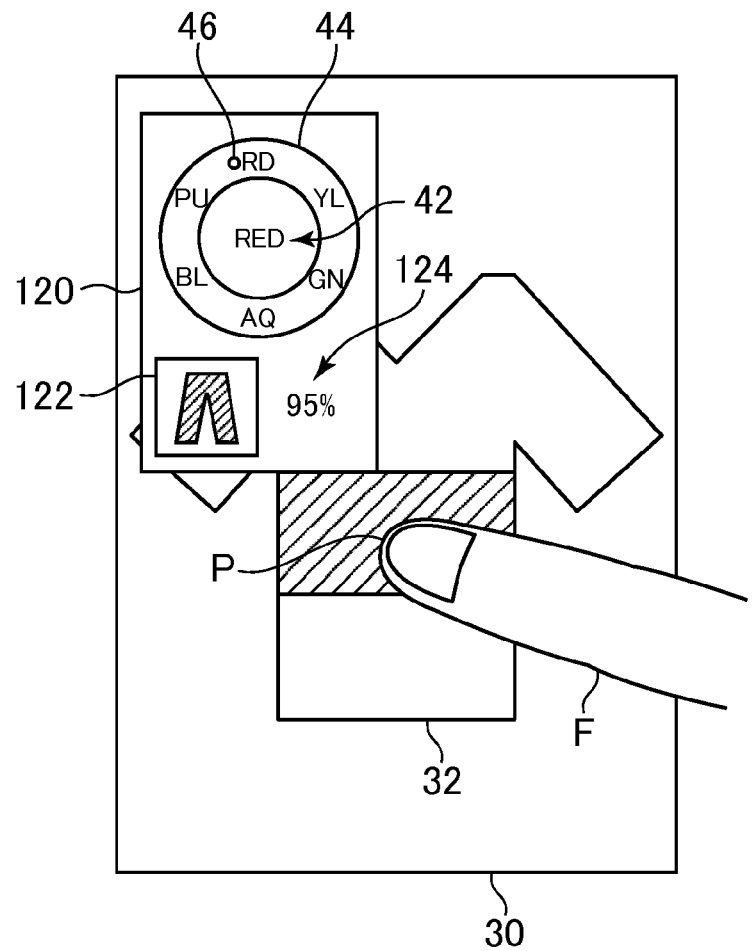
FIG. 20 is a diagram illustrating yet still another example of the color check screen.

FIG. 20 illustrates an example of the color check screen 30 in the fifth embodiment. As illustrated in FIG. 20, a notification field 120 is displayed on the color check screen 30 in the fifth embodiment. A color group name 42, a color map 44, a marker 46, a base image 122, and a similarity 124 are displayed on the notification field 120. The color group name 42, the color map 44, and the marker 46 are the same as those in the notification field 40 of the first embodiment (see FIG. 3).

The base image 122 is an image selected as the base image. The similarity 124 indicates the level of similarity between the color of the image selected as the base image and the color of the image displayed on the color check screen 30 (the color of the user's specified point P). By referring to the similarity 124, the user can grasp the level of similarity between the color of the image selected as the base image and the color of the image displayed on the color check screen 30.

Instead of displaying the similarity 124, a message that is based on the level of similarity between the color of the image selected as the base image and the color of the image displayed on the color check screen 30 may be displayed on the color check screen 30. For example, whether or not the similarity level is higher than a reference similarity level may be determined so that, when the similarity level is higher than the reference similarity, a message to that effect is displayed on the color check screen 30. When the similarity level is higher than the reference similarity, a given image which illustrates the fact may be displayed on the color check screen 30, or a given effect may be applied on the color check screen 30. In this manner, the user can grasp the fact that the level of similarity between the color of the image selected as the base image and the color of the image displayed on the color check screen 30 is high via the message (or the image or the effect).

Figure 21:
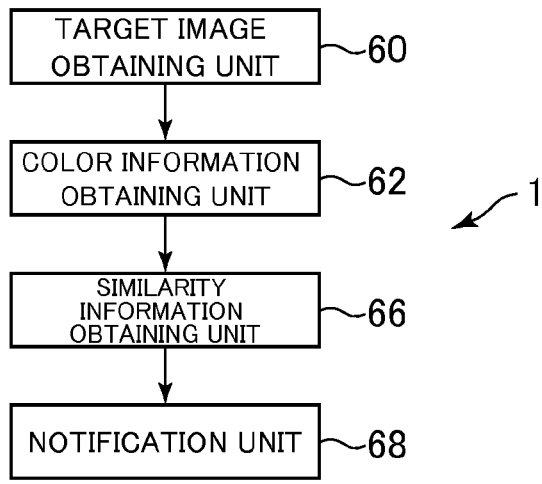
FIG. 21 is a functional block diagram illustrating still another example of functions that are implemented in the image processing system.

FIG. 21 is a functional block diagram illustrating function blocks that are relevant to the present invention out of function blocks implemented in the image processing system 1 according to the fifth embodiment. As illustrated in FIG. 21, the image processing system 1 according to the fifth embodiment includes a target image obtaining unit 60, a color information obtaining unit 62, a similarity information obtaining unit 66, and a notification unit 68. The target image obtaining unit 60 and the color information obtaining unit 62 are the same as those in the first embodiment (see FIG. 6). A description on these function blocks is omitted here.

The similarity information obtaining unit 66 is described. The similarity information obtaining unit 66 obtains similarity information related to the level of similarity between the color information of the base image and the color information obtained by the color information obtaining unit 62.

The notification unit 68 is described. The notification unit 68 notifies the user of the similarity information obtained by the similarity information obtaining unit 66. For example, as illustrated in FIG. 20, the notification unit 68 displays the similarity 124 on the color check screen 30.

The notification unit 68 may be designed so as to make a notification to the user when the similarity level described above is higher than a reference similarity level. For example, the notification unit 68 may display a given message or a given image on the color check screen 30 when the similarity level is higher than a reference similarity level. Alternatively, when the similarity level is higher than a reference similarity level, the notification unit 68 may apply an effect on the color check screen 30 such as causing the color check screen 30 to glow.

Figure 22:
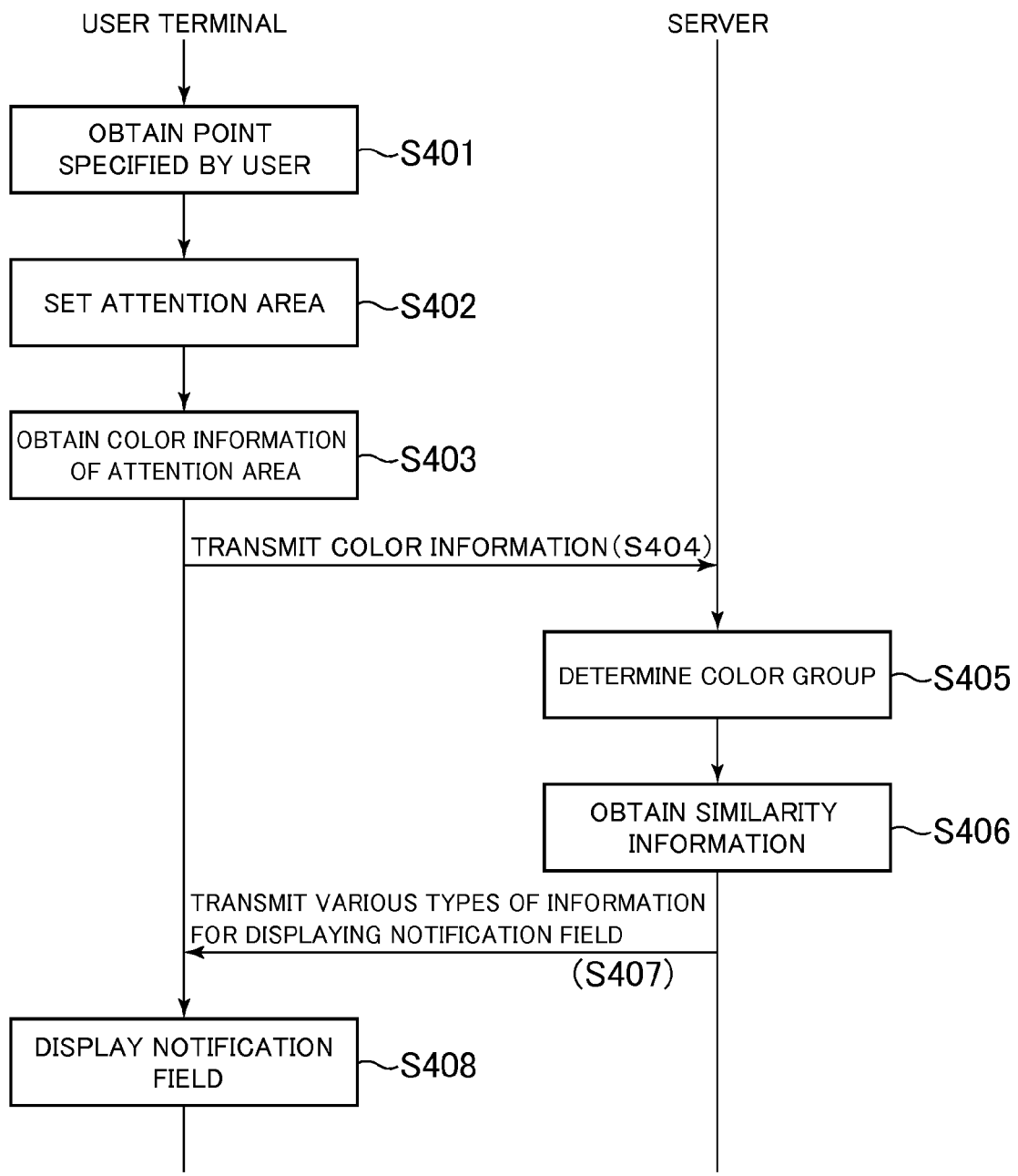
FIG. 22 is a diagram illustrating yet still another example of processing that is executed in the image processing system.

An example of processing that is executed in the image processing system 1 according to the fifth embodiment is described next. FIG. 22 is a flowchart illustrating an example of processing that is executed in the image processing system 1 when a point in the color check screen 30 is specified by the user. FIG. 22 illustrates processing for the case of displaying the color check screen 30 as illustrated in FIG. 20.

Steps S401 to S405 in FIG. 22 are the same as Steps S101 to S105 in FIG. 7. However, in Step S404, the user ID is transmitted to the server 10 along with the color information.

After Step S405 is executed, the control unit 11 (the similarity information obtaining unit 66) of the server 10 obtains similarity information related to the level of similarity between the color information of the image selected as the base image and the color information obtained in Step S403 (S406). For example, the control unit 11 compares the color feature amount of the image selected as the base image and the color feature amount of the attention area (the color feature amount of the color information obtained in Step S403) with each other. A measure called the EMD, for example, is used in the comparison in color feature amount as in Step S106 of FIG. 7.

In this case, the distribution of the color feature amount of the attention area (the color feature amount of the color information obtained in Step S403) corresponds to the distribution P described above. The distribution P accordingly has only one color feature amount as described above. The distribution of the color feature amount of the base image corresponds to the distribution Q. More specifically, the distribution of the color feature amount of n colors of the base image reduced to n colors corresponds to the distribution Q. In Step S406, the control unit 11 calculates the EMD between the distributions P and Q described above, and obtains, as the similarity information, a value obtained by converting the calculated EMD into a percentage.

After Step S406 is executed, the control unit 11 transmits various types of information necessary to display the notification field 120 to the user terminal 20 (S407). For example, the control unit 11 transmits the following information to the user terminal 20.

Color group information related to the color group determined in Step S405

Base image information (e.g., link information) related to the image selected as the base image The similarity information obtained in Step S406

The user terminal 20 receives this information transmitted from the server 10, and the control unit 21 of the user terminal 20 displays the notification field 120 on the color check screen 30 based on the information (S408).

For example, the control unit 21 displays the color group name 42 in the notification field 120 based on the color group information received from the server 10. The control unit 21 also displays the marker 46 on the color map 44 in the notification field 120 based on the color information obtained in Step S403. The control unit 21 further displays the base image 122 and the similarity 124 in the notification field 120 based on the base image information and similarity information received from the server 10. The description of the processing of FIG. 22 has been given above.

Now, a description is given on processing for the case of displaying a message on the color check screen 30 when the level of similarity between the color information of the image selected as the base image and the color information obtained in Step S403 is high.

The control unit 11 in this case determines whether or not the similarity level obtained in Step S406 is higher than a reference similarity level after Step S406 is executed. In the case where the similarity level is higher than the reference similarity level, the control unit 11 transmits message information to that effect to the user terminal 20. The control unit 21 of the user terminal 20 displays a message on the color check screen 30 based on the received message information.

The control unit 21 of the user terminal 20 may determine whether or not the similarity level obtained in Step S406 is higher than the reference similarity level after Step S406 is executed. In the case where the similarity level is higher than the reference similarity level, the control unit 21 may display a message to that effect on the color check screen 30.

The image processing system 1 according to the fifth embodiment described above is capable of providing an aid that makes it easier for a user to know whether or not the color of the image selected as the base image and the color of the image displayed on the color check screen 30 are similar to each other.

The image processing system 1 according to the fifth embodiment can also be used to provide an aid that makes it easier for a user to know whether or not an object whose color changes with the elapse of time has reached a desired state. For example, the image processing system 1 according to the fifth embodiment can be used to aid a user in cooking.

A case of aiding the user in grilling meat is discussed here. The user in this case takes an image of nicely done meat and registers the image in the database 16 in advance. When it is time to actually grill meat, the user selects this image (the image of nicely done meat) as the base image. The user then uses the photographing unit 26 to take a picture with the meat while cooking as the subject, and specifies a point in the meat image that is displayed on the color check screen 30.

Figure 23:
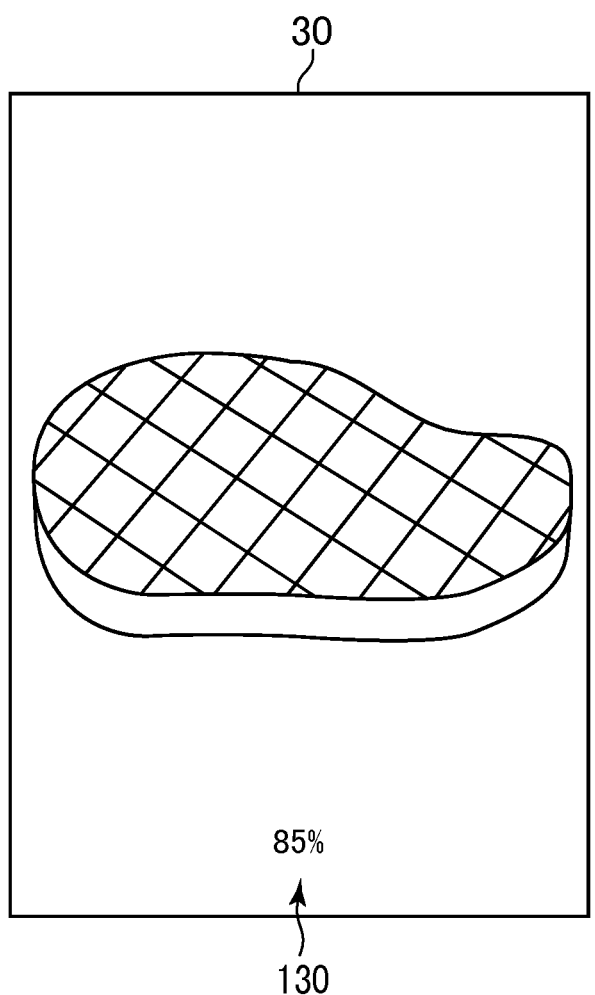
FIG. 23 is a diagram illustrating yet still another example of the color check screen.

In this case, the level of similarity between the color of the base image and the color of the image of the cooking meat is displayed on the color check screen 30. FIG. 23 illustrates an example of the color check screen 30 in this case. The user can know whether or not the meat has reached the proper doneness by relying on the similarity 130 displayed on the color check screen 30 which is denoted by 130.

In the case described above, photographed images of the meat may be obtained repeatedly as time passes. In other words, a video may be photographed by the photographing unit 26. Photographed images of the meat are obtained at given time intervals (for example, 1/60-second intervals) in this case. The level of similarity between the color of the base image (the image of nicely done meat) and the color of the photographed meat image may be calculated each time the photographed meat image is obtained. The similarity 130 displayed on the color check screen 30 is then updated.

In addition to an image of nicely done meat, an image of undercooked meat and an image of overcooked meat may be registered in the database 16 along with descriptive texts, such as "undercooked" and "overcooked", so that these images can be selected as a base image. The user can thus know that the state of the cooking meat is closer to one of these states.

The image processing system 1 according to the fifth embodiment can also be used for other cases than the case of grilling meat. For example, the image processing system 1 according to the fifth embodiment can be used for a case of cooking onion till lightly browned. The user in this case takes an image of lightly browned onion and registers the image in the database 16 in advance. When it is time to actually cook onion till lightly browned, the user selects this image (the image of lightly browned onion) as the base image. The user then uses the photographing unit 26 to take a picture of the onion while cooking, and specifies a point in the onion image that is displayed on the color check screen 30.

The similarity 130 between the color of the base image and the color of the image of the cooking onion is displayed on the color check screen 30 in this case. The user can know whether or not the onion has reached the light brown color by relying on the similarity 130 displayed on the color check screen 30.

In addition to the cases described above, the image processing system 1 according to the fifth embodiment can also be used for, for example, a case of making tea.

Base images that correspond to respective steps of cooking may be registered in the database 16. For example, when the user is executing Step A, a base image that corresponds to Step A is set automatically. When the user completes Step A (in other words, when the user performs given operation that indicates the completion of Step A), a base image that corresponds to Step B next to Step A may be automatically set.

The image processing system 1 according to the fifth embodiment can also be used for other cases than cooking. For example, the image processing system 1 according to the fifth embodiment can also be used to aid a user in knowing the peak of ripeness of a fruit. The user in this case takes a picture of a fruit that is at the peak of ripeness, and registers the photographed image in the database 16 in advance. When determining whether or not the fruit is ripe, the user selects this image (the photographed image of the fruit at the peak of ripeness) as the base image. The user then takes a picture of the fruit with the photographing unit 26, and specifies a point in the fruit image displayed on the color check screen 30.

The similarity 130 between the color of the base image and the color of the fruit image displayed on the color check screen 30 is displayed on the color check screen 30 in this case. The user can know whether or not the fruit is ripe by relying on the similarity 130 displayed on the color check screen 30.

The present invention is not limited to the first to fifth embodiments described above.

[1] For instance, a "continuous area that includes the attention point or the attention area and that has color information that is the same as or similar to color information of the attention point or the attention area" within the target image may be presented to the user. In the following description, the "continuous area that includes the attention point or the attention area and that has the color information that is the same as or similar to the color information of the attention point or the attention area" is referred to as "same-color area".

Figure 24:
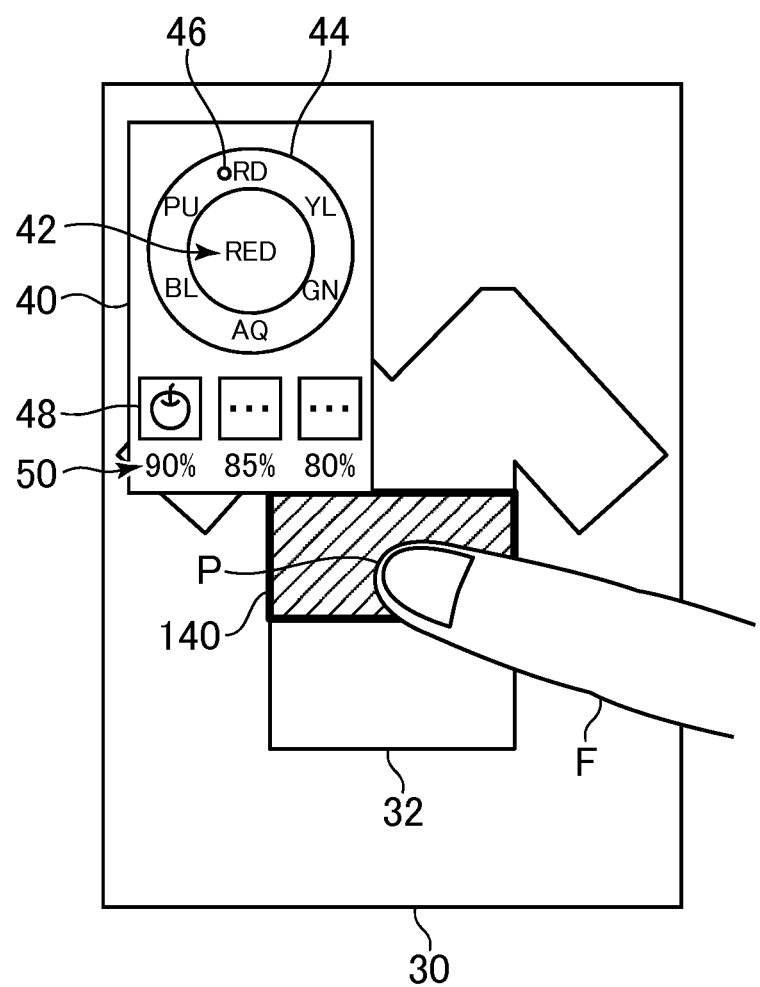
FIG. 24 is a diagram illustrating yet still another example of the color check screen.

FIG. 24 illustrates an example of the color check screen 30 in this case. A boundary line 140 is displayed on the color check screen 30 of FIG. 24. The boundary line 140 indicates the boundary line of the same-color area.

An example of how the same-color area is detected is described.

The control unit 21 first determines whether or not the color of a pixel adjacent to the attention area is the same as or similar to the color of the attention area. For example, the control unit 21 determines that the color of the adjacent pixel is the same as or similar to the color of the attention area when the Euclidean distance between the color value of the adjacent pixel and the color value of the attention area is smaller than a reference value. Instead of the Euclidean distance, the mean square error, the Mahalanobis distance, or the Earth Mover's Distance, for example, may be used.

Alternatively, the control unit 21 may determine that the color of the adjacent pixel is the same as or similar to the color of the attention area when a color group to which the color of the adjacent pixel belongs and a color group to which the color of the attention area belongs are the same.

In the case where it is determined that the color of the adjacent pixel is the same as or similar to the color of the attention area, the control unit 21 further determines whether or not the color of a pixel adjacent to the adjacent pixel is the same as or similar to the color of the attention area. The control unit 21 detects the same-color area in this manner.

The method of detecting the same-color area is not limited to the one described above. For example, various methods for area segmentation may be used.

In this way, the image processing system 1 can aid a user in grasping the extent of an area that has the color of the point specified by the user. For instance, a color-blind person has difficulties in distinguishing brown and blue from each other in some cases. Therefore, in the case of a piece of clothing that has a pattern made up of brown bands and blue bands, for example, the color-blind person cannot recognize the boundary between a brown area and a blue area, and finds it difficult to recognize the pattern that is made up of wide bands. According to the manner described above, when the color of the user's specified point P is brown, for example, the boundary line of the brown area is presented to the user so that the user can grasp the brown area. The image processing system 1 can consequently aid the user in grasping the pattern that is made up of wide bands.

[2] To give another example, some of the information displayed in the notification field 40 or 120 may be omitted. For example, the color map 44 and the marker 46 may be omitted.

[3] To give still another example, the image processing system 1, which includes the server 10 and the user terminal 20 in the description given above, may not include the server 10. In other words, all of the function blocks illustrated in FIG. 6 (or FIG. 13 or FIG. 21) may be implemented in the user terminal 20 (image processing device).

In the case where all of the function blocks are implemented in the user terminal 20, the user terminal 20 may directly access the database 16. Alternatively, the database 16 may be built in the user terminal 20. In other words, images and data (for example, FIGS. 4, 5, 9, 11, 14, and 16) that are stored in the database 16 (or the auxiliary storage unit 13) in the description given above may be stored in the auxiliary storage unit 23 of the user terminal 20.

In the case where all of the function blocks are implemented in the user terminal 20, processing that is executed by the server 10 in the description given above is executed by the user terminal 20.

[4] The image processing system 1 according to the second to fifth embodiments, for example, is useful not only to color-blind people but also to people who have normal color vision.

The invention claimed is:

1. An image processing system, comprising:
an exemplary combination data storage that stores exemplary combination data related to exemplary combinations of color information;
at least one processor; and
at least one memory device that stores a plurality of instructions, which when executed by the at least one processor, cause the at least one processor to operate to:
obtain color information of an attention point or an attention area within a target image, the attention point or the attention area being set based on a point or an area within the target image that is specified by a user;
obtain a photographed or drawn image of a subject whose color is the same as or similar to a color indicated by the color information of the attention point or the attention area, from among a plurality of images stored in an image storage;
cause an output unit to output the obtained image;
determine, based on the exemplary combination data, whether or not a combination of color information of an image stored in the image storage and the color information of the attention point or the attention area is one of the exemplary combinations; and
cause the output unit to output a notification if it is determined that the combination of the color information of the image stored in the image storage and the color information of the attention point or the attention area is one of the exemplary combinations.

2. The image processing system according to claim 1, wherein the plurality of instructions cause the at least one processor to operate to cause the output unit to output similarity information related to a level of the similarity between color information of the obtained image and the color information of the attention point or the attention area.

3. The image processing system according to claim 1, wherein the plurality of instructions cause the at least one processor to operate to cause the output unit to output information related to the obtained image.

4. The image processing system according to claim 1, wherein the image storage stores images taken or selected by the user in the past,
wherein the image storage stores text information in association with each of the images taken or selected by the user in the past, and
wherein the plurality of instructions cause the at least one processor to operate to cause the output unit to output the text information which is associated with the obtained image.

5. The image processing system according to claim 1, wherein, in the case where it is determined that the combination of the color information of the image stored in the image storage and the color information of the attention point or the attention area is one of the exemplary combinations, the plurality of instructions cause the at least one processor to operate to cause the output unit to output at least one of the image or information related to the image.

6. The image processing system according to claim 1, wherein the plurality of instructions cause the at least one processor to operate to set, as a base image, based on a user's selection operation, one of a plurality of images stored in the image storage,
wherein the plurality of instructions cause the at least one processor to operate to determine whether or not a combination of the color information of the base image and the color information of the attention point or the attention area is one of the exemplary combinations, and
wherein the plurality of instructions cause the at least one processor to operate to cause the output unit to output the notification in a case where it is determined that the combination of the color information of the base image and the color information of the attention point or the attention area is one of the exemplary combinations.

7. The image processing system according to claim 1, wherein the plurality of instructions cause the at least one processor to operate to set, as a base image, based on a user's selection operation, one of a plurality of images stored in the image storage,
wherein the plurality of instructions cause the at least one processor to operate to obtain the similarity information related to the level of similarity between the color information of the base image and the color information of the attention point or the attention area, and
the plurality of instructions cause the at least one processor to execute at least one of:
processing of causing the output unit to output the notification in a case where the similarity level is higher than a reference similarity level; or
processing of causing the output unit to output the similarity information.

8. The image processing system according to claim 7,
wherein the plurality of instructions cause the at least one processor to operate to obtain, repeatedly as time elapses, a photographed image of a subject whose color changes with the elapse of time as the target image; and
wherein a point or an area that is within an area of the target image where the photographed subject is located and that is specified by the user is set as the attention point or the attention area.

9. The image processing system according to claim 1,
wherein the plurality of instructions cause the at least one processor to operate to present to the user an area within the target image that is a continuous area including the attention point or the attention area and that has color information that is the same as or similar to the color information of the attention point or the attention area.

10. The image processing system according to claim 1,
wherein the plurality of instructions cause the at least one processor to operate to determine to which of a plurality of pieces of color group information the color information of the attention point or the attention area belongs; and
a unit that presents wherein the plurality of instructions cause the at least one processor to operate to present to the user one of the plurality of pieces of color group information to which the color information of the attention point or the attention area belongs.

11. An image processing method, comprising:
obtaining color information of an attention point or an attention area within a target image, the attention point or the attention area being set based on a point or an area within the target image that is specified by a user;
obtaining a photographed or drawn image of a subject whose color is the same as or similar to a color indicated by the color information of the attention point or the attention area, from among a plurality of images stored in an image storage;
causing an output unit to output the obtained image;
determining, based on exemplary combination data that is data related to exemplary combinations of color information and that is stored in an exemplary combination data storage, whether or not a combination of color information of an image stored in the image storage and the color information of the attention point or the attention area is one of the exemplary combinations; and
causing the output unit to output a notification if it is determined that the combination of the color information of the image stored in the image storage and the color information of the attention point or the attention area is one of the exemplary combinations.

12. A non-transitory computer-readable information recording medium having recorded thereon a program for causing a computer to:
obtain color information of an attention point or an attention area within a target image, the attention point or the attention area being set based on a point or an area within the target image that is specified by a user;
obtain a photographed or drawn image of a subject whose color is the same as or similar to a color indicated by the color information of the attention point or the attention area, from among a plurality of images stored in an image storage;
cause an output unit to output the obtained image;
determine, based on exemplary combination data that is data related to exemplary combinations of color information and that is stored in an exemplary combination data storage, whether or not a combination of color information of an image stored in the image storage and the color information of the attention point or the attention area is one of the exemplary combinations; and
cause the output unit to output a notification if it is determined that the combination of the color information of the image stored in the image storage and the color information of the attention point or the attention area is one of the exemplary combinations.

\* \* \* \* \*